(12) United States Patent
Tobata et al.

(10) Patent No.: US 10,633,589 B2
(45) Date of Patent: Apr. 28, 2020

(54) LIQUID CRYSTAL MEDIUM, OPTICAL DEVICE AND LIQUID CRYSTAL COMPOUND

(71) Applicants: JNC CORPORATION, Tokyo (JP); JNC PETROCHEMICAL CORPORATION, Tokyo (JP)

(72) Inventors: Hitoshi Tobata, Chiba (JP); Eiji Okabe, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 86 days.

(21) Appl. No.: 15/792,761

(22) Filed: Oct. 25, 2017

(65) Prior Publication Data

US 2018/0112131 A1 Apr. 26, 2018

(30) Foreign Application Priority Data

Oct. 25, 2016 (JP) ................. 2016-208321

(51) Int. Cl.
| | | |
|---|---|---|
| G02F 1/1333 | (2006.01) | |
| C09K 19/30 | (2006.01) | |
| C09K 19/58 | (2006.01) | |
| C09K 19/20 | (2006.01) | |
| C09K 19/04 | (2006.01) | |
| C09K 19/12 | (2006.01) | |
| C09K 19/18 | (2006.01) | |
| C09K 19/34 | (2006.01) | |

(52) U.S. Cl.
CPC ...... C09K 19/3001 (2013.01); C09K 19/0403 (2013.01); C09K 19/12 (2013.01);
(Continued)

(58) Field of Classification Search
CPC .................. C09K 19/3001; C09K 19/0403; C09K 19/12; C09K 19/18; C09K 19/3402;
(Continued)

(56) References Cited

U.S. PATENT DOCUMENTS

| | | |
|---|---|---|
| 2009/0323010 A1 | 12/2009 | Haseba et al. |
| 2011/0069245 A1 | 3/2011 | Haseba et al. |

(Continued)

FOREIGN PATENT DOCUMENTS

| | | |
|---|---|---|
| GB | 2435583 | 8/2007 |
| JP | 20060089622 | 4/2006 |

(Continued)

OTHER PUBLICATIONS

Hirotsugu Kikuchi et al.,"Polymer-stabilized liquid crystal blue phases", Nature Materials,vol. 1,Sep. 2, 2002, pp. 64-68.

Yoshiaki Hisakado et al.,"Large Electro-optic Kerr Effect in Polymer-Stabilized Liquid-Crystalline Blue Phases", Adv. Mater,vol. 17, No. 1, Jan. 6, 2005, pp. 96-98.

Yasuhiro Haseba et al.,"Electro-optic effects of the optically isotropic state induced by the incorporative effects of a polymer network and the chirality of liquid crystal", Journal of the SID, vol. 14/6, 2006, pp. 551-556.

Primary Examiner — Geraldina Visconti
(74) Attorney, Agent, or Firm — JCIPRNET

(57) ABSTRACT

Provided are a liquid-crystal-medium having stability to heat, light and so forth, a wide liquid-crystal-phase temperature-range and significantly large dielectric-anisotropy and developing an optically isotropic liquid-crystal-phase; and various optical-devices used in a wide temperature-range, having short response-time, a large contrast-ratio and low drive-voltage and suppressing decrease in an effective dielectric-constant in a high-frequency range.

A Liquid-crystal composition contains achiral-component T containing at least one compound selected from a first component represented by formula (1) and at least one compound selected from a second component represented by formula (2) or (3) and a chiral-agent to develop optically-isotropic liquid-crystal-phase:

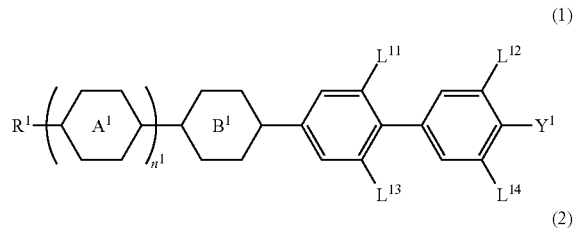

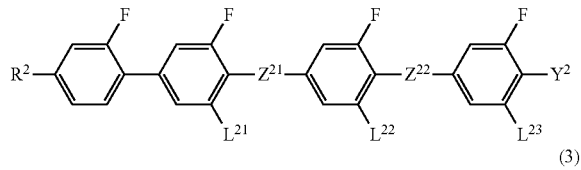

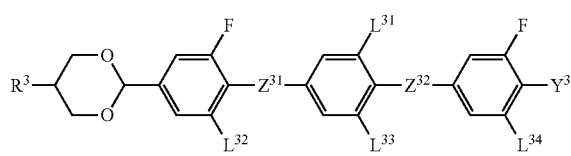

In formula (1), $R^1$: alkyl, ring $A^1$: 1,4-cyclohexylene, ring $B^1$: 1,4-phenylene, $L^{11}$ to $L^{14}$: fluorine, $Y^1$: fluorine, $n^1$: 1 or 2, $R^2$: alkyl, $Z^{21}$ and $Z^{22}$: single-bond or —$CF_2O$—, $L^{21}$ to $L^{23}$: fluorine, $Y^2$: fluorine, $R^3$: alkyl, $Z^{31}$ and $Z^{32}$: single-bond or —$CF_2O$—, $L^{31}$ to $L^{34}$: fluorine, $Y^3$: fluorine, for example.

13 Claims, 1 Drawing Sheet

(52) U.S. Cl.
 CPC .............. *C09K 19/18* (2013.01); *C09K 19/20* (2013.01); *C09K 19/3402* (2013.01); *C09K 19/586* (2013.01); *C09K 19/588* (2013.01); *C09K 2019/0411* (2013.01); *C09K 2019/0414* (2013.01); *C09K 2019/0448* (2013.01); *C09K 2019/0466* (2013.01); *C09K 2019/124* (2013.01); *C09K 2019/181* (2013.01); *C09K 2019/183* (2013.01); *C09K 2019/3019* (2013.01); *C09K 2019/3025* (2013.01); *C09K 2019/3422* (2013.01)

(58) Field of Classification Search
 CPC .... C09K 19/20; C09K 19/586; C09K 19/588; C09K 2019/0411; C09K 2019/0414; C09K 2019/124; C09K 2019/183; C09K 2019/3019; C09K 2019/3025; C09K 2019/3422; C09K 2019/0448; C09K 2019/0466; C09K 2019/181; G02F 1/1333
 USPC .................................................. 252/299.01
 See application file for complete search history.

(56) References Cited

U.S. PATENT DOCUMENTS

| | | | |
|---|---|---|---|
| 2011/0242473 | A1 | 10/2011 | Haseba et al. |
| 2016/0215217 | A1 | 7/2016 | Akiyama et al. |
| 2016/0376503 | A1* | 12/2016 | Tanaka .................. C09K 19/32 252/299.61 |
| 2018/0112131 | A1* | 4/2018 | Tobata ............... C09K 19/0403 |

FOREIGN PATENT DOCUMENTS

| | | |
|---|---|---|
| JP | 2007277531 | 10/2007 |
| JP | 2014005380 | 1/2014 |
| JP | 2015001705 | 1/2015 |
| WO | 2009139330 | 11/2009 |
| WO | 2010058681 | 5/2010 |
| WO | 2013156113 | 10/2013 |
| WO | 2014196527 | 12/2014 |

* cited by examiner

Optical System for Measurement
(Use of comb electrode cell)

LIQUID CRYSTAL MEDIUM, OPTICAL DEVICE AND LIQUID CRYSTAL COMPOUND

CROSS-REFERENCE TO RELATED APPLICATIONS

This application claims the priority benefit of Japanese application serial no. 2016-208321, filed on Oct. 25, 2016. The entirety of the above-mentioned patent application is hereby incorporated by reference herein and made a part of this specification.

TECHNICAL FIELD

The invention relates to a liquid crystal composition useful as a material for an optical device, for example, an optical device in which the liquid crystal composition is used, and so forth.

BACKGROUND ART

A liquid crystal display device in which a liquid crystal composition is used is widely used in a display of a watch, a calculator, a cellular phone, a personal computer, a television receiver or the like. The liquid crystal display devices utilize refractive index anisotropy or dielectric anisotropy of a liquid crystal compound, or the like. As an operating mode of the liquid crystal display device, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode or the like is known, according to which display is made by mainly using one or more polarizing plates. Further, a research has been recently conducted on a mode in which an electric field is applied thereto in an optically isotropic liquid crystal phase to develop electric birefringence (Patent literature Nos. 1 to 9, Non-patent literature Nos. 1 to 3).

A classification based on a driving mode in the device includes a passive matrix (PM) and an active matrix (AM). The passive matrix (PM) is classified into static, multiplex and so forth, and the AM is classified into a thin film transistor (TFT), a metal insulator metal (MIM) and so forth according to a kind of a switching device thereof.

Moreover, a composition having a tetracyclic compound that contains no bonding group is disclosed in Patent literature Nos. 3 to 7. However, the composition disclosed in Patent literature each described above is a composition outside the scope of claims of the invention, and the Patent literature has no description with respect to an effective dielectric constant in a high frequency range.

CITATION LIST

Patent Literature

Patent literature No. 1: WO 2010/058681 A.
Patent literature No. 2: WO 2013/156113 A.
Patent literature No. 3: WO 2014/196527 A.
Patent literature No. 4: JP 2015-1705 A.
Patent literature No. 5: JP 2014-5380 A.
Patent literature No. 6: GB 2435583 A.
Patent literature No. 7: JP 2007-277531 A.
Patent literature No. 8: JP 2006-89622 A.
Patent literature No. 9: WO 2009/139330 A.

Non-patent Literature

Non-patent literature No. 1: Nature Materials, 1, 64, (2002).
Non-patent literature No. 2: Adv. Mater., 17, 96, (2005).
Non-patent literature No. 3: Journal of the SID, 14, 551, (2006).

SUMMARY OF INVENTION

Under the situations described above, a liquid crystal medium that has stability to heat, light and so forth, a wide liquid crystal phase temperature range and significantly large dielectric anisotropy to develop an optically isotropic liquid crystal phase is required. Moreover, various optical devices that can be used in a wide temperature range, have a short response time, a large contrast ratio and low drive voltage and suppress reduction of an effective dielectric constant in a high frequency range are required.

The invention provides a liquid crystal medium (a liquid crystal composition, a polymer-liquid crystal composite material), a mixture of a polymerizable monomer and the liquid crystal composition, an optical device including the liquid crystal medium, and the liquid crystal compound as described below, for example.

Item 1. A liquid crystal composition that contains achiral component T and a chiral agent, and the liquid crystal composition in which achiral component T contains at least one compound selected from the group of compounds represented by formula (1) as a first component and at least one compound selected from the group of compounds represented by formula (2) and formula (3) as a second component to develop an optically isotropic liquid crystal phase:

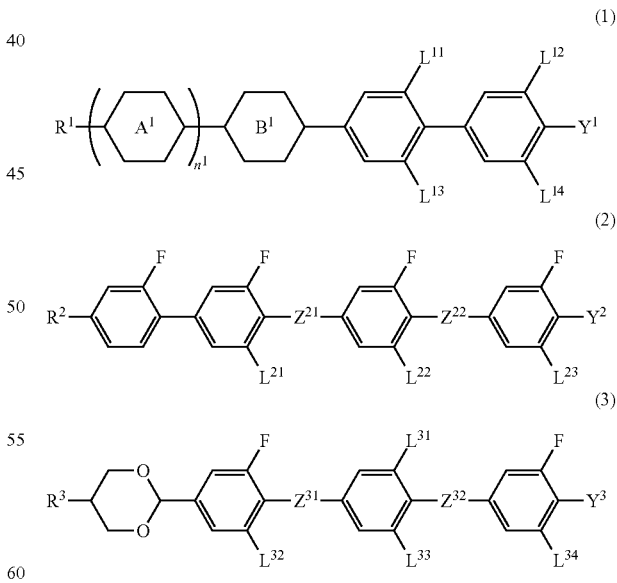

wherein, in formula (1), $R^1$ is alkyl having 1 to 12 carbons, alkenyl having 2 to 12 carbons, alkynyl having 2 to 12 carbons or alkoxy having 1 to 11 carbons; ring $A^1$ is 1,4-cyclohexylene, 2-fluoro-1,4-phenylene, 3-fluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; ring $B^1$ is 1,4-cyclohexylene, 1,4-phenylene, 2-fluoro-1,4-phenylene, 3-fluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; $L^{11}$ to $L^{14}$ are independently hydrogen, fluorine or chlorine; $Y^1$ is fluorine, chlorine, —$CF_3$, —$OCF_3$, alkyl having 1 to 12 carbons or alkoxy having 1 to 11 carbons; and $n^1$ is 1 or 2, and in formula (2), $R^2$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons; $Z^{21}$ and $Z^{22}$ are independently a single bond or —$CF_2O$—; $L^{21}$ to $L^{23}$ are independently hydrogen, fluorine or chlorine; and $Y^2$ is fluorine, chlorine, —$CF_3$ or —$OCF_3$, and in formula (3), $R^3$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons; $Z^{31}$ and $Z^{32}$ are independently a single bond or —$CF_2O$—; $L^{31}$ to $L^{34}$ are independently hydrogen, fluorine or chlorine; and $Y^3$ is fluorine, chlorine, —$CF_3$ or —$OCF_3$.

Item 2. The liquid crystal composition according to item 1, wherein achiral component T further contains at least one compound selected from the group of compounds represented by formula (4) as a third component to develop the optically isotropic liquid crystal phase:

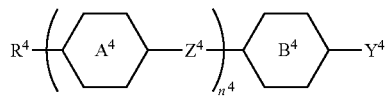

wherein, in formula (4), $R^4$ is hydrogen, alkyl having 1 to 12 carbons, alkenyl having 2 to 12 carbons, alkynyl having 2 to 12 carbons or alkoxy having 1 to 11 carbons; ring $A^4$ and ring $B^4$ are independently 1,4-cyclohexylene, 1,4-phenylene, 2-fluoro-1,4-phenylene, 3-fluoro-1,4-phenylene, 2,5-difluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; $Z^4$ is a single bond, —O—, —COO—, —$CH_2CH_2$—, —$CH_2O$— and —$CF_2O$—; $Y^4$ is fluorine, chlorine, —$CF_3$, —$OCF_3$, alkyl having 1 to 12 carbons, alkenyl having 2 to 12 carbons or alkoxy having 1 to 11 carbons; and $n^4$ is 1 or 2.

Item 3. The liquid crystal composition according to item 1 or 2, containing a compound in which $n^1$ is 1 in formula (1) to develop the optically isotropic liquid crystal phase.

Item 4. The liquid crystal composition according to item 1 or 2, containing at least one compound selected from the group of compounds represented by formula (1-1) to formula (1-7) as the first component to develop the optically isotropic liquid crystal phase:

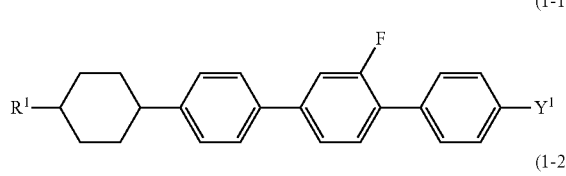

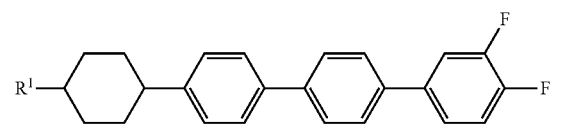

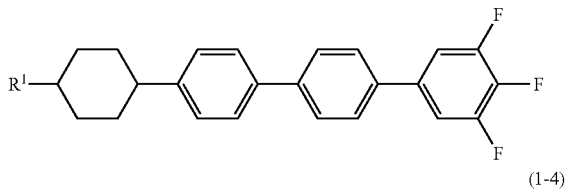

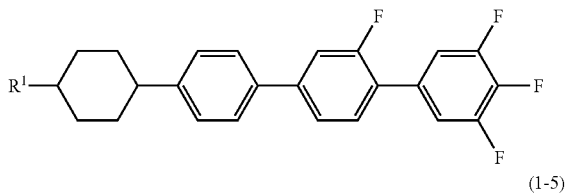

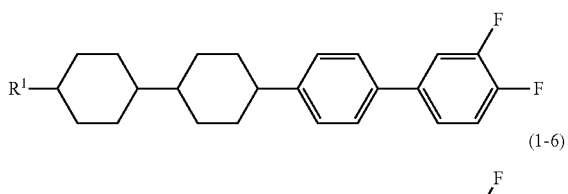

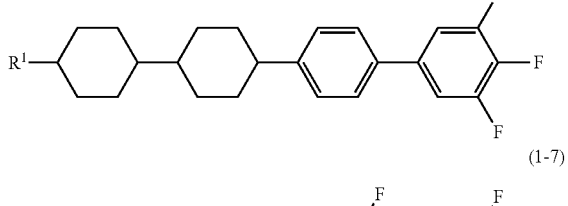

wherein, in formula (1-1) to formula (1-7), $R^1$ is alkyl having 1 to 12 carbons, alkenyl having 2 to 12 carbons, alkynyl having 2 to 12 carbons or alkoxy having 1 to 11 carbons; and $Y^1$ is fluorine, chlorine, —$CF_3$, —$OCF_3$, alkyl having 1 to 12 carbons or alkoxy having 1 to 11 carbons.

Item 5. The liquid crystal composition according to any one of items 1 to 4, containing at least one compound selected from the group of compounds represented by formula (2-1) to formula (2-6) as the second component to develop the optically isotropic liquid crystal phase:

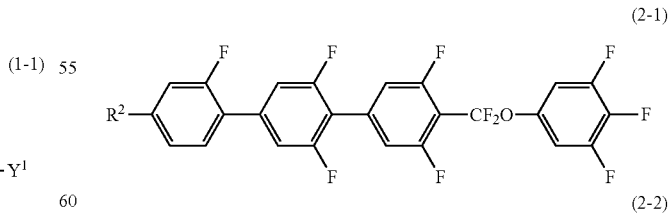

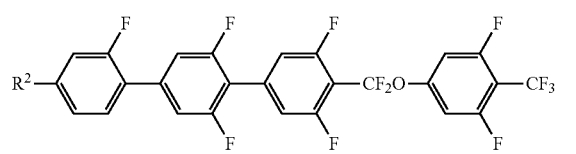

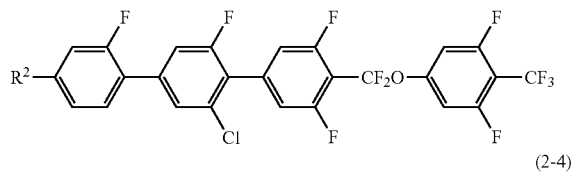
(2-3)

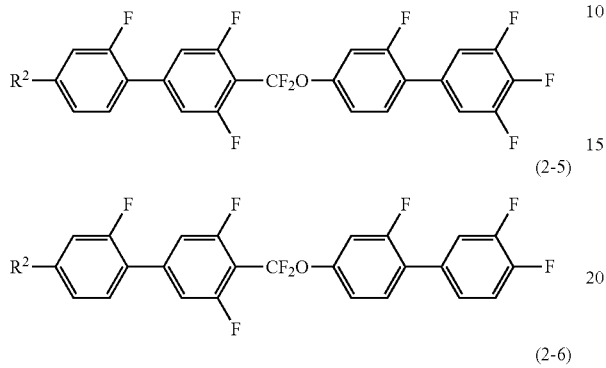
(2-4)
(2-5)
(2-6)

wherein, in formula (2-1) to formula (2-6), $R^2$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons.

Item 6. The liquid crystal composition according to any one of items 1 to 5, containing at least one compound selected from the group of compounds represented by formula (3-1) to formula (3-3) as the second component to develop the optically isotropic liquid crystal phase:

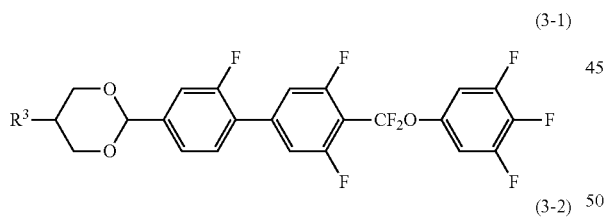
(3-1)
(3-2)

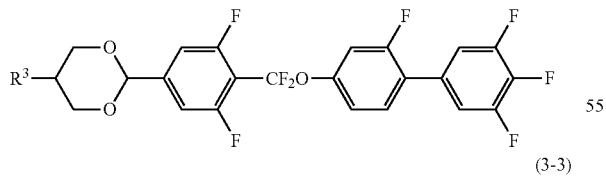
(3-3)

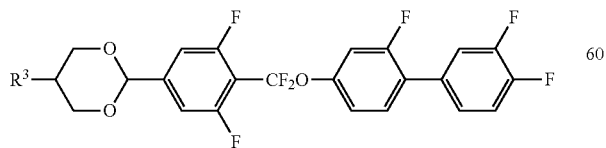

wherein, in formula (3-1) to formula (3-3), $R^3$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons.

Item 7. The liquid crystal composition according to any one of items 1 to 6, containing at least one compound selected from the group of compounds represented by formula (4-1) to formula (4-23) as the third component to develop the optically isotropic liquid crystal phase:

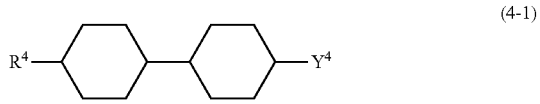
(4-1)

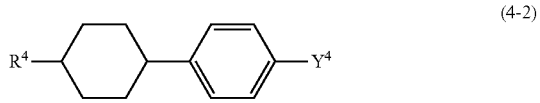
(4-2)

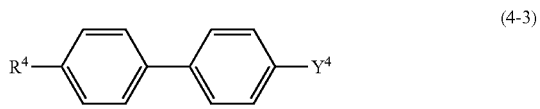
(4-3)

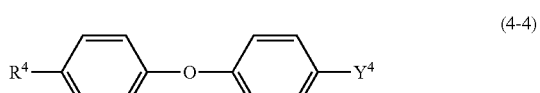
(4-4)

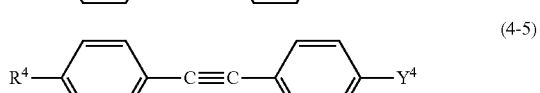
(4-5)

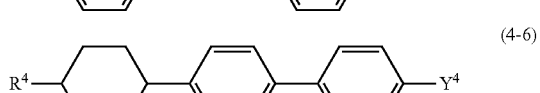
(4-6)

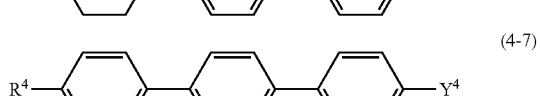
(4-7)

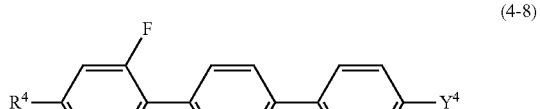
(4-8)

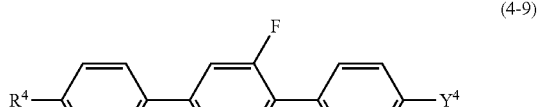
(4-9)

(4-10)

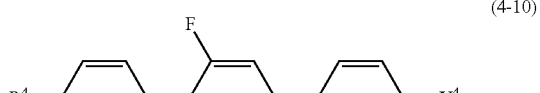
(4-11)

(4-12) 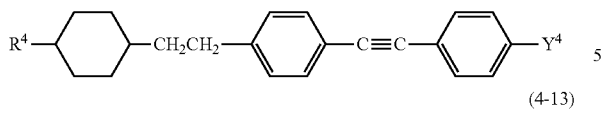

(4-13) 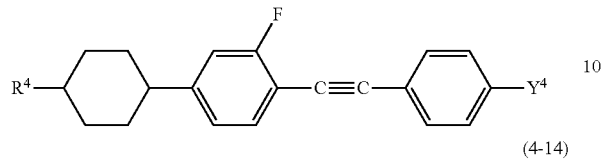

(4-14) 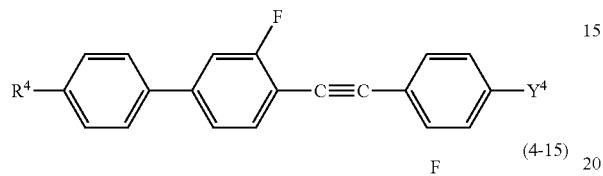

(4-15) 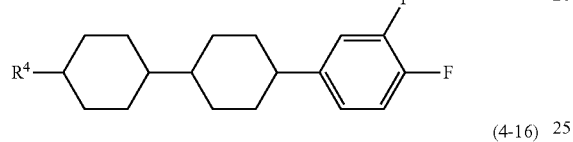

(4-16) 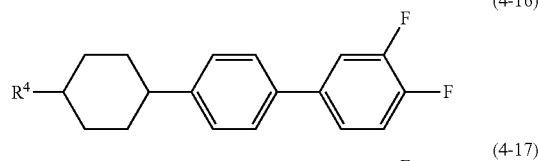

(4-17) 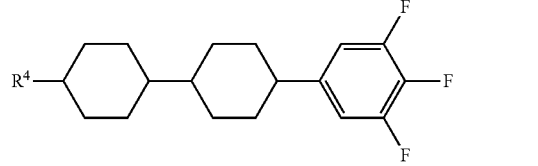

(4-18) 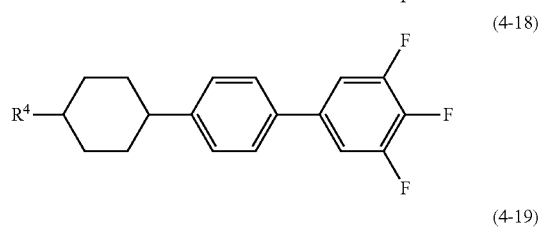

(4-19) 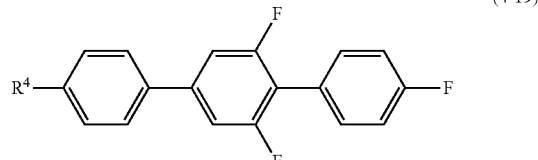

(4-20) 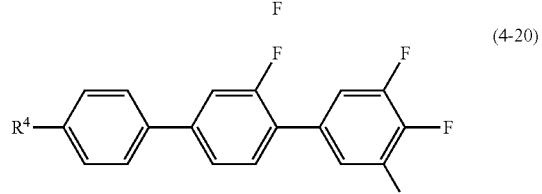

(4-21) 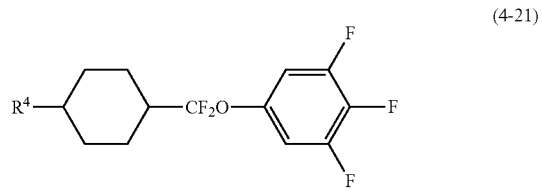

(4-22) 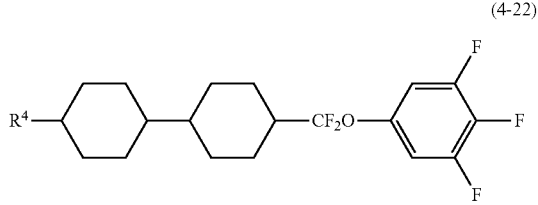

(4-23) 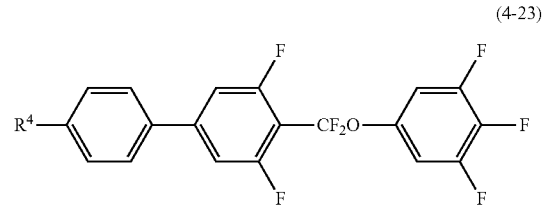

wherein, in formula (4-1) to formula (4-23), $R^4$ is hydrogen, alkyl having 1 to 12 carbons, alkenyl having 2 to 12 carbons, alkynyl having 2 to 12 carbons or alkoxy having 1 to 11 carbons; and $Y^4$ is fluorine, chlorine, —$CF_3$, —$OCF_3$, alkyl having 1 to 12 carbons, alkenyl having 2 to 12 carbons or alkoxy having 1 to 11 carbons.

Item 8. The liquid crystal composition according to any one of items 2 to 7, containing 1% by weight to 30% by weight of the first component, 50% by weight to 95% by weight of the second component and 1% by weight to 30% by weight of the third component, based on the total weight of achiral component T.

Item 9. The liquid crystal composition according to any one of items 1 to 8, wherein the chiral agent is at least one compound selected from the group of compounds represented by formulas (K1) to (K6):

(K1) 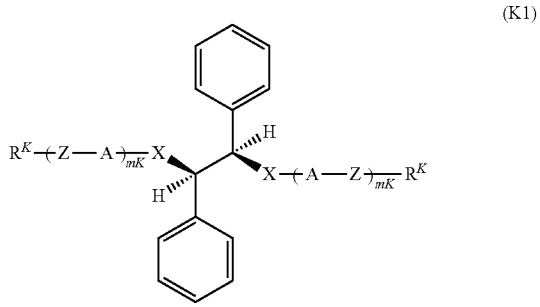

(K2) 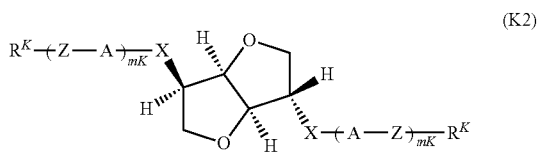

-continued

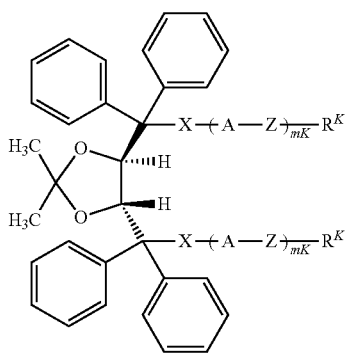
(K3)

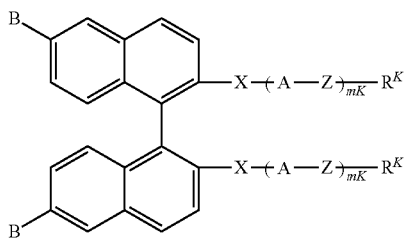
(K4)

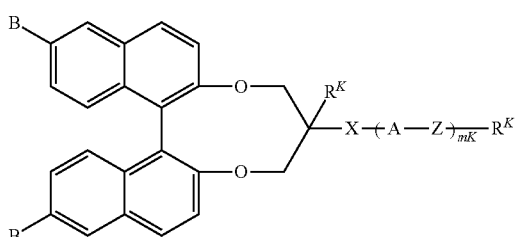
(K5)

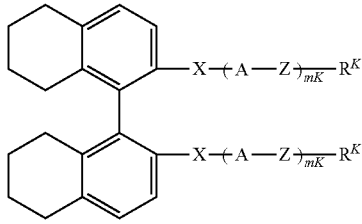
(K6)

wherein, in the formulas, $R^K$ is each independently hydrogen, halogen, —C≡N, —N=C=O, —N=C=S or alkyl having 1 to 20 carbons, at least one piece of —CH$_2$— in $R^K$ may be replaced by —O—, —S—, —COO— or —OCO—, at least one piece of —CH$_2$—CH$_2$— in $R^K$ may be replaced by —CH=CH—, —CF=CF— or —C≡C—, and at least one hydrogen in $R^K$ may be replaced by fluorine or chlorine;

A is each independently an aromatic 6-membered to 8-membered ring, a non-aromatic 3-membered to 8-membered ring or a condensed ring having 9 or more carbons, and at least one hydrogen on the rings may be replaced by halogen, or alkyl or haloalkyl having 1 to 3 carbons, —CH$_2$— on the rings may be replaced by —O—, —S— or —NH—, and —CH= may be replaced by —N=;

B is each independently hydrogen, halogen, alkyl having 1 to 3 carbons, haloalkyl having 1 to 3 carbons, an aromatic 6-membered to 8-membered ring, a non-aromatic 3-membered to 8-membered ring or a condensed ring having 9 or more carbons, and at least one hydrogen on the rings may be replaced by halogen, or alkyl or haloalkyl having 1 to 3 carbons, —CH$_2$— in the alkyl may be replaced by —O—, —S— or —NH—, and —CH= may be replaced by —N=;

Z is each independently a single bond or alkylene having 1 to 8 carbons, and at least one piece of —CH$_2$— in Z may be replaced by —O—, —S—, —COO—, —OCO—, —CSO—, —OCS—, —N=N—, —CH=N— or —N=CH—, at least one piece of —CH$_2$—CH$_2$— in Z may be replaced by —CH=CH—, —CF=CF— or —C≡C—, and at least one hydrogen in Z may be replaced by halogen;

X is each independently a single bond, —COO—, —OCO—, —CH$_2$O—, —OCH$_2$—, —CF$_2$O—, —OCF$_2$— or —CH$_2$CH$_2$—; and mK is each independently an integer from 1 to 4.

Item 10. The liquid crystal composition according to any one of items 1 to 9, exhibiting a chiral nematic phase in a temperature range of −20° C. to 70° C., and having a helical pitch of 700 nanometers or less in at least part of the temperature range.

Item 11. A mixture, containing the liquid crystal composition according to any one of items 1 to 10 and a polymerizable monomer.

Item 12. A polymer-liquid crystal composite material, obtained by polymerizing the mixture according to item 11 and used in a device driven in an optically isotropic liquid crystal phase.

Item 13. An optical device having electrodes arranged on one or both of substrates, a liquid crystal medium arranged between the substrates, and an electric field applying means for applying an electric field to the liquid crystal medium through the electrodes, and the optical device in which the liquid crystal medium is the liquid crystal composition according to any one of items 1 to 10, or the polymer-liquid crystal composite material according to item 12.

Item 14. Use of the liquid crystal composition according to any one of items 1 to 10 or the polymer-liquid crystal composite material according to item 12 in an optical device.

"Liquid crystal compound" herein represents a compound having a mesogen, and is not limited to a compound of developing a liquid crystal phase. Specifically, the term is a generic term for a compound of developing the liquid crystal phase such as a nematic phase and a smectic phase, and a compound having no liquid crystal phase but being useful as a component of the liquid crystal composition.

"Liquid crystal medium" is a generic term for the liquid crystal composition and the polymer-liquid crystal composite.

"Achiral component" is an achiral mesogen compound, and is a component containing neither an optically active compound nor a compound having a polymerizable functional group. Accordingly, "achiral component" does not include a chiral agent, a monomer, a polymerization initiator, an antioxidant, an ultraviolet light absorbent, a curing agent, a stabilizer or the like.

"Chiral agent" is an optically active compound, and a component used for being added for providing the liquid crystal composition with desired twisted molecular arrangement.

"Liquid crystal display device" is a generic term for a liquid crystal display panel and a liquid crystal display module.

Moreover, "optical device" means various devices that exerts a function of optical modulation, optical switching or the like by utilizing an electro-optic effect, and specific examples include an optical modulator used in a display device (liquid crystal display device), an optical communication system, optical information processing and various sensor systems. With regard to the optical modulation that utilizes a change of a refractive index by applying voltage to an optically isotropic liquid crystal medium, a Kerr effect is known. The Kerr effect means a phenomenon in which a value of electric birefringence Δn(E) is proportional to a square of electric field E, and an equation: $\Delta n(E)=K\lambda E^2$ holds in a material exhibiting the Kerr effect (K: Kerr coefficient (Kerr constant), λ: wavelength). Here, the value of electric birefringence means a value of refractive index anisotropy induced when the electric field is applied to an isotropic medium.

"Liquid crystal compound," "liquid crystal composition" and "liquid crystal display device" may be occasionally abbreviated as "compound," "composition" and "device," respectively.

Moreover, for example, a maximum temperature of the liquid crystal phase is a phase transition temperature between the liquid crystal phase and an isotropic phase, and may be occasionally abbreviated simply as a clearing point or maximum temperature. A minimum temperature of the liquid crystal phase may be occasionally abbreviated simply as minimum temperature. A compound represented by formula (1) may be occasionally abbreviated as compound 1. The abbreviation may occasionally apply also to a compound represented by formula (2) or the like. In formula (1) or (4), a symbol such as $A^1$, $B^1$, $A^4$ and $B^4$ surrounded by a hexagonal shape corresponds to ring $A^1$, ring $B^1$, ring $A^4$ and ring $B^4$, respectively. An amount of compound expressed in terms of percentage is expressed in terms of weight percentage (% by weight) based on the total weight of the composition. A plurality of identical symbols such as $R^1$, $Y^1$, $R^2$, $R^3$, $R^4$ and $Y^4$ are described in identical formulas or different formulas, but the symbols may be identical or different.

Alkyl herein may have a straight chain or a branched chain, and specific examples of the alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$ and —$C_{12}H_{25}$.

Alkoxy herein may have a straight chain or a branched chain, and specific examples of the alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_7$, —$OC_9H_{19}$, —$OC_{10}H_{21}$ and —$OC_{11}H_{23}$.

Alkoxyalkyl herein may have a straight chain or a branched chain, and specific examples of the alkoxyalkyl include —$CH_2OCH_3$, —$CH_2OC_2H_5$, —$CH_2OC_3H_7$, —$CH_2OC_4H_9$, —$CH_2OC_5H_{11}$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Alkenyl herein may have a straight chain or a branched chain, and specific examples of the alkenyl include —CH=$CH_2$, —CH=$CHCH_3$, —$CH_2$CH=$CH_2$, —CH=$CHC_2H_5$, —$CH_2$CH=$CHCH_3$, —$(CH_2)_2$—CH=$CH_2$, —CH=$CHC_3H_7$, —$CH_2$CH=$CHC_2H_5$, —$(CH_2)_2$—CH=$CHCH_3$ and —$(CH_2)_3$—CH=$CH_2$.

A preferred configuration of —CH=CH— herein depends on a position of a double bond. A trans configuration is preferred in alkenyl having the double bond in an odd-numbered position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. A cis configuration is preferred in alkenyl having the double bond in an even-numbered position, such as —$CH_2$CH=$CHCH_3$, —$CH_2$CH=$CHC_2H_5$ and —$CH_2$CH=$CHC_3H_7$. An alkenyl compound having the preferred configuration has high maximum temperature or a wide temperature range of the liquid crystal phase. A detailed description is found in Mol. Cryst. Liq. Cryst., 1985, 131, 109 and Mol. Cryst. Liq. Cryst., 1985, 131, 327. Moreover, as a position of an alkenyl group, a position in which no conjugation is formed with a benzene ring is preferred.

Alkynyl herein may have a straight chain or a branched chain, and specific examples of the alkynyl include —C≡CH, —C≡$CCH_3$, —$CH_2$C≡CH, —C≡$CC_2H_5$, —$CH_2$C≡$CCH_3$, —$(CH_2)_2$—C≡CH, —C≡$CC_3H_7$, —$CH_2$C≡$CC_2H_5$, —$(CH_2)_2$—C≡$CCH_3$ and —C≡$C(CH_2)_5$.

Specific examples of halogen herein include fluorine, chlorine, bromine and iodine.

$R^1$ herein preferably has a structure represented by formulas (CHN-1) to (CHN-4). $R^1$ further preferably has a structure represented by formula (CHN-1) or (CHN-2).

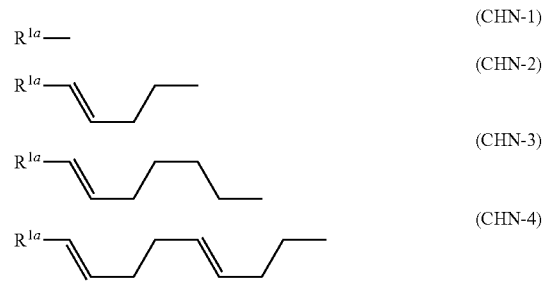

wherein, in the formulas, $R^{1a}$ is hydrogen or alkyl having 1 to 12 carbons.

$R^2$, $R^{11}$, $R^{21}$, $R^{12}$, $R^{13}$, $R^{22}$, $R^{23}$, $R^4$, $R^5$, $R^{41}$, $R^{42}$, $R^{51}$, $R^{52}$, $R^6$, $R^7$, $R^{61}$, $R^{62}$, $R^{71}$, $R^{72}$ and $R^8$ herein are also defined in a manner similar to the definitions of $R^1$.

DESCRIPTION OF EMBODIMENTS

Figure 1:
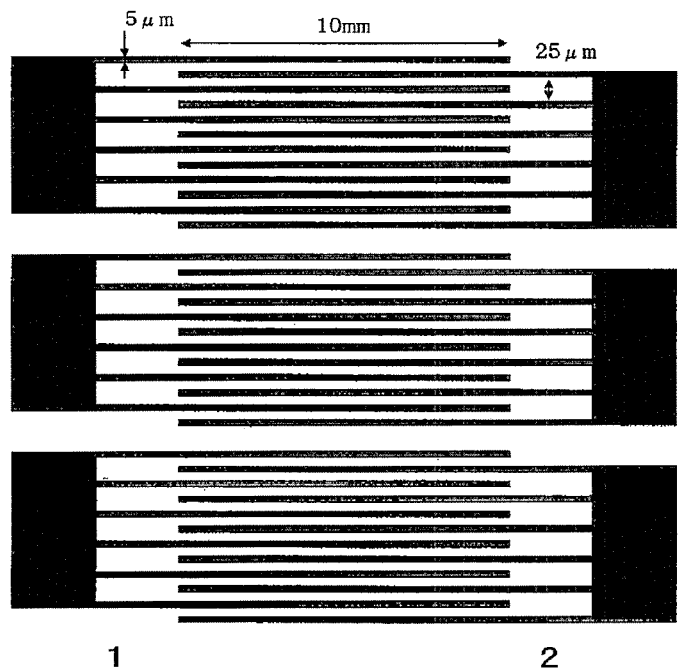
FIG. 1 shows a comb-shaped electrode substrate used in Examples.

A liquid crystal composition, a polymer-liquid crystal composite material and so forth of the invention exhibit stability to heat, light and so forth, a high maximum temperature and a low minimum temperature of an optically isotropic liquid crystal phase, and have large dielectric anisotropy. Moreover, the polymer-liquid crystal composite material in a preferred aspect of the invention exhibits the high maximum temperature and the low minimum temperature of the optically isotropic liquid crystal phase, has low drive voltage in an optical device driven in the optically isotropic liquid crystal phase, and suppresses reduction of an effective dielectric constant in a high frequency range.

Moreover, the optical device driven in the optically isotropic liquid crystal phase in the preferred aspect of the invention can be used in a wide temperature range, driven at low voltage to allow a high-speed electro-optic response, has a large contrast ratio, and suppresses reduction of the effective dielectric constant in the high frequency range.

A liquid crystal composition having an optically isotropic liquid crystal phase of the invention contains achiral component T and a chiral agent, and achiral component T contains, as a first component, at least one compound selected from the group of compounds represented by formula (1) described above, and as a second component, at least one compound selected from the group of compounds represented by formula (2) described above and compounds represented by formula (3) described above. A first aspect of the liquid crystal composition of the invention is a composition containing the first component, the second component and any other component a name of which is not particularly described herein. First, the compound represented by formula (1) will be described. Moreover, the liquid crystal composition of the invention may further contain a solvent, a monomer, a polymerization initiator, a curing agent, a stabilizer (an antioxidant, an ultraviolet light absorbent or the like) or the like in addition to the component described above.

1-1 Compound 1

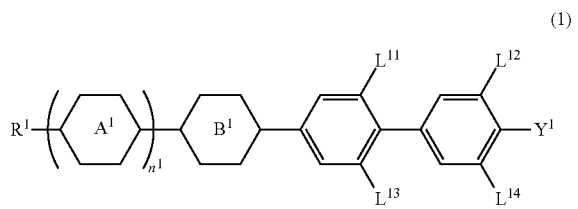

(1)

In formula (1), $R^1$ is alkyl having 1 to 12 carbons, alkenyl having 2 to 12 carbons, alkynyl having 2 to 12 carbons or alkoxy having 1 to 11 carbons, and $R^1$ is preferably alkyl having 1 to 12 carbons, and further preferably alkyl having 1 to 5 carbons.

In formula (1), ring $A^1$ is 1,4-cyclohexylene, 2-fluoro-1,4-phenylene, 3-fluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; and ring $B^1$ is 1,4-cyclohexylene, 1,4-phenylene, 2-fluoro-1,4-phenylene, 3-fluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl.

As an example of preferred ring $A^1$, 1,4-cyclohexylene or tetrahydropyran-2,5-diyl in which a temperature range of a liquid crystal phase is wide and compatibility with other compounds is comparatively good is preferred. Then, 2-fluoro-1,4-phenylene, 3-fluoro-1,4-phenylene or 3,5-difluoro-1,4-phenylene in which dielectric anisotropy is large and refractive index anisotropy is large is preferred. Pyridine-2,5-diyl or pyrimidine-2,5-diyl in which the dielectric anisotropy is significantly large and the refractive index anisotropy is large is preferred. Then, 1,3-dioxane-2,5-diyl in which the dielectric anisotropy is significantly large is preferred. Then, 1,4-cyclohexylene, 1,3-dioxane-2,5-diyl or tetrahydropyran-2,5-diyl is particularly preferred.

As an example of preferred ring $B^1$, 1,4-cyclohexylene or tetrahydropyran-2,5-diyl in which the temperature range of the liquid crystal phase is wide and the compatibility with other compounds is comparatively good is preferred. Then, 1,4-phenylene in which a melting point is low and the compatibility with other compounds is good is preferred. Then, 2-fluoro-1,4-phenylene, 3-fluoro-1,4-phenylene or 3,5-difluoro-1,4-phenylene in which the dielectric anisotropy is large and the refractive index anisotropy is large is preferred. Then, pyridine-2,5-diyl or pyrimidine-2,5-diyl in which the dielectric anisotropy is significantly large and the refractive index anisotropy is large is preferred. Then, 1,3-dioxane-2,5-diyl in which the dielectric anisotropy is significantly large is preferred. Then, 1,4-phenylene, 2-fluoro-1,4-phenylene, 3-fluoro-1,4-phenylene or 3,5-difluoro-1,4-phenylene is particularly preferred.

In formula (1), $L^{11}$ to $L^{14}$ are each independently hydrogen, fluorine or chlorine, and a compound in which $L^{11}$ to $L^{14}$ are hydrogen has a high clearing point, and good compatibility at low temperature, and a compound in which $L^{11}$ to $L^{14}$ are fluorine has a low melting point, and significantly large dielectric anisotropy. Moreover, a compound in which $L^{11}$ to $L^{14}$ are chlorine has a low melting point, large dielectric anisotropy, and good compatibility with other compounds.

In formula (1), $Y^1$ is fluorine, chlorine, —$CF_3$, —$OCF_3$, alkyl having 1 to 12 carbons or alkoxy having 1 to 11 carbons.

Specific examples of preferred $Y^1$ include fluorine, —$CF_3$ or alkyl having 1 to 12 carbons. Specific examples of further preferred $Y^1$ include fluorine or alkyl having 1 to 12 carbons.

Compound 1 is preferably a compound represented by formulas (1-1) to (1-7).

(1-1)

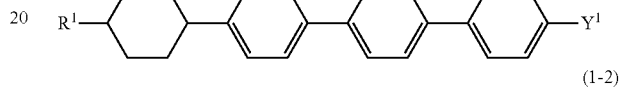

(1-2)

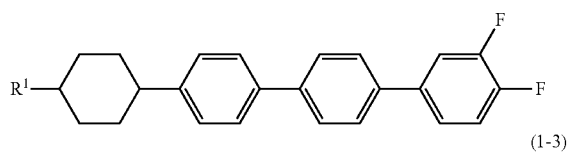

(1-3)

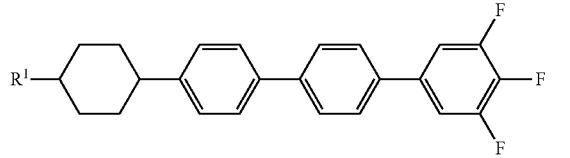

(1-4)

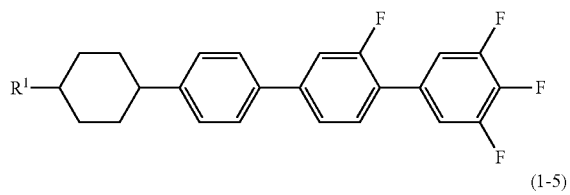

(1-5)

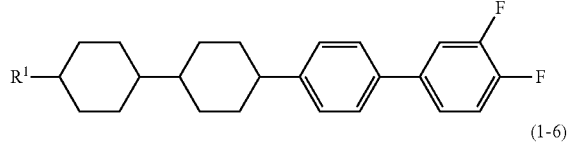

(1-6)

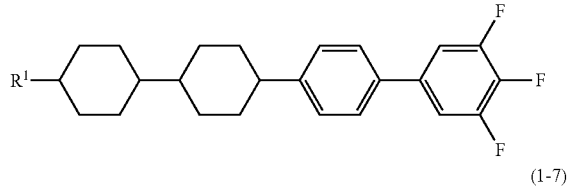

(1-7)

wherein, in the formulas, $R^1$ is defined in a manner identical with the definitions in compound 1.

Compound 1 is significantly stable physically and chemically under conditions in which the device is ordinarily used, and in compound 1 in which $Y^1$ is fluorine, chlorine, —$CF_3$ or —$OCF_3$, the clearing point is high, the dielectric anisotropy is large and the refractive index anisotropy is comparatively large, and therefore compound 1 is useful as a component for decreasing drive voltage of the liquid crystal composition driven in the optically isotropic liquid crystal phase. In compound 1 in which $Y^1$ is alkyl having 1 to 12 carbons or alkoxy having 1 to 11 carbons, the clearing point is high, and the compatibility with other compounds is comparatively good. A composition containing the compound is stable under conditions in which the device is ordinarily used. Accordingly, if compound 1 in the liquid crystal composition is used, the temperature range of the liquid crystal phase can be extended, and the composition can be used in the form of the display device in the wide temperature range. Further, reduction of an effective dielectric constant in a high frequency range is suppressed.

1-2 Compound 2

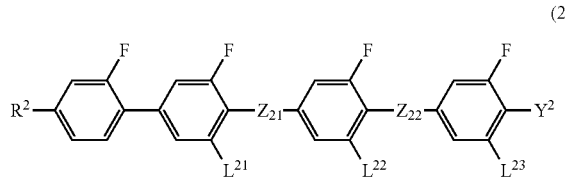

wherein, in formula (2), $R^2$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons.

In formula (2), $Z^{21}$ and $Z^{22}$ are independently a single bond or —$CF_2O$—.

For example, one of preferred $Z^{21}$ and $Z^{22}$ is a single bond, and the other is —$CF_2O$—.

In formula (2), $L^{21}$ or $L^{22}$ is each independently hydrogen, fluorine or chlorine, and in compound 2 in which $L^{21}$ or $L^{22}$ is hydrogen, the clearing point is high and the compatibility at low temperature is good, and in compound 2 in which $L^{21}$ or $L^{22}$ is fluorine, the melting point is low and the dielectric anisotropy is significantly large. Moreover, in compound 2 in which $L^{21}$ to $L^{22}$ are chlorine, the melting point is low, the dielectric anisotropy is large, and the compatibility with other compounds is good.

In formula (2), $Y^2$ is fluorine, chlorine, —$CF_3$ or —$OCF_3$.

Specific examples of preferred $Y^2$ include fluorine or —$CF_3$. Specific examples of further preferred $Y^2$ include fluorine.

Compound 2 is preferably a compound represented by formulas (2-1) to (2-6).

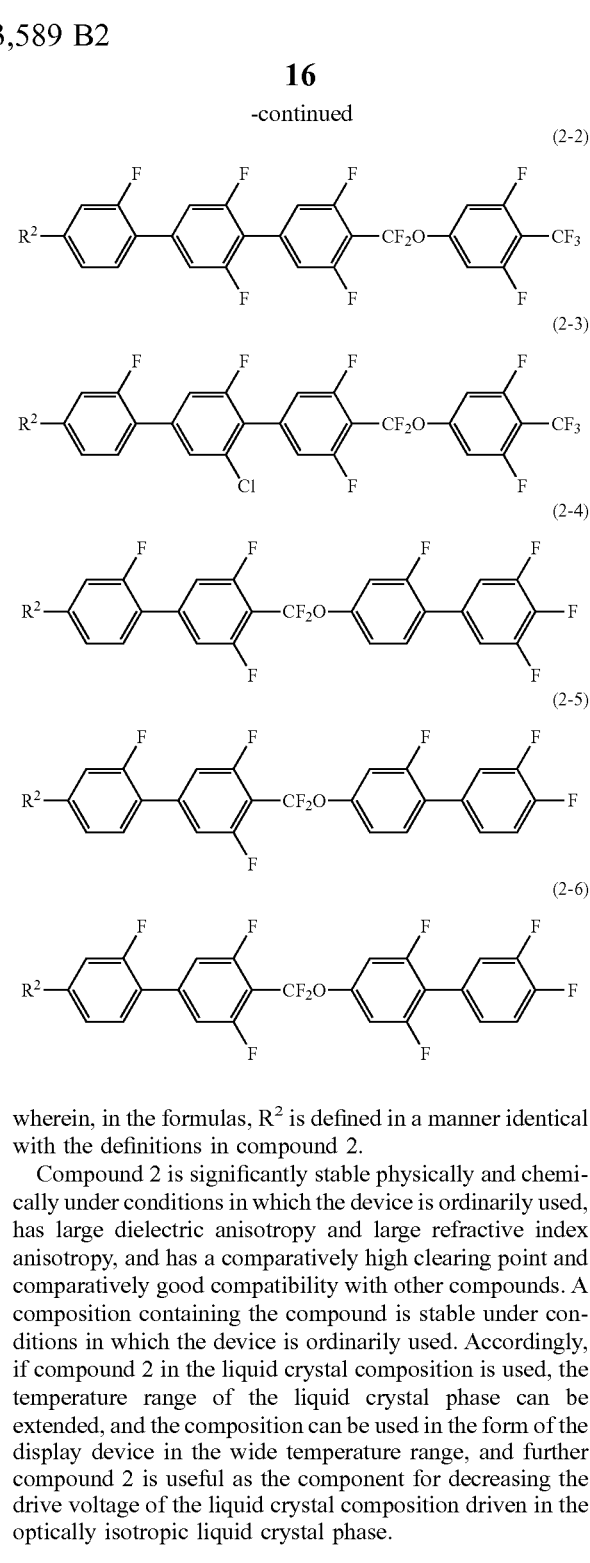

wherein, in the formulas, $R^2$ is defined in a manner identical with the definitions in compound 2.

Compound 2 is significantly stable physically and chemically under conditions in which the device is ordinarily used, has large dielectric anisotropy and large refractive index anisotropy, and has a comparatively high clearing point and comparatively good compatibility with other compounds. A composition containing the compound is stable under conditions in which the device is ordinarily used. Accordingly, if compound 2 in the liquid crystal composition is used, the temperature range of the liquid crystal phase can be extended, and the composition can be used in the form of the display device in the wide temperature range, and further compound 2 is useful as the component for decreasing the drive voltage of the liquid crystal composition driven in the optically isotropic liquid crystal phase.

1-3 Compound 3

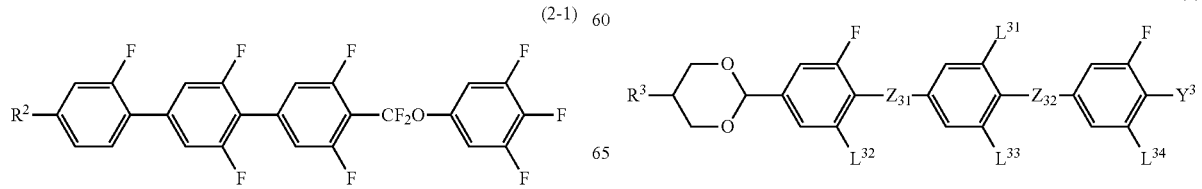

wherein, in formula (3), $R^3$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons.

In formula (3), $Z^{31}$ and $Z^{32}$ are independently a single bond or —$CF_2O$—.

As a preferred example of preferred $Z^{31}$ and $Z^{32}$, one is a single bond, and the other is —$CF_2O$—.

In formula (3), $L^{31}$ to $L^{34}$ are each independently hydrogen, fluorine or chlorine, and in compound 3 in which $L^{31}$ to $L^{34}$ are hydrogen, the clearing point is high, and the compatibility at low temperature is good, and in compound 3 in which $L^{31}$ to $L^{34}$ are fluorine, the melting point is low, and the dielectric anisotropy is significantly large. Moreover, in compound 3 in which $L^{31}$ to $L^{34}$ are chlorine, the melting point is low, the dielectric anisotropy is large, and the compatibility with other compounds is good.

In formula (3), $Y^3$ is fluorine, chlorine, —$CF_3$ or —$OCF_3$.

Specific examples of preferred $Y^3$ include fluorine or —$CF_3$. Specific examples of further preferred $Y^3$ include fluorine.

Compound 3 is preferably a compound represented by formulas (3-1) to (3-3).

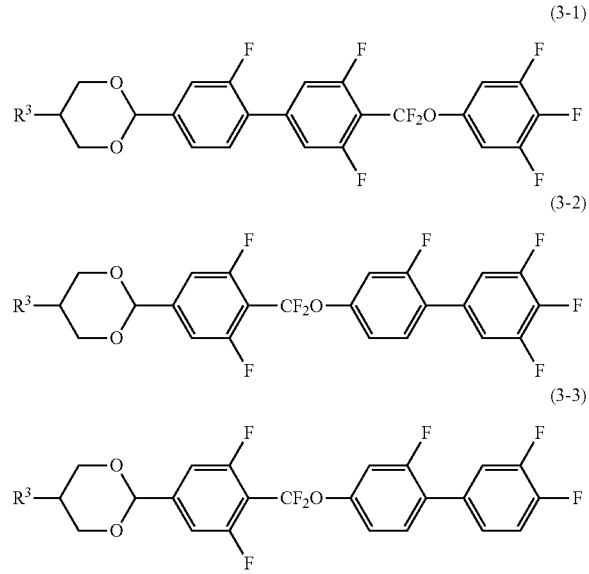

wherein, in the formulas, $R^3$ is defined in a manner identical with the definitions in compound 3.

Compound 3 is significantly stable physically and chemically under conditions in which the device is ordinarily used, has comparatively large dielectric anisotropy and comparatively large refractive index anisotropy, and has a high clearing point and comparatively good compatibility with other compounds. A composition containing the compound is stable under conditions in which the device is ordinarily used. Accordingly, if compound 3 in the liquid crystal composition is used, the temperature range of the liquid crystal phase can be extended, and the composition can be used in the form of the display device in the wide temperature range, and further compound 3 is useful as the component for decreasing the drive voltage of the liquid crystal composition driven in the optically isotropic liquid crystal phase.

1-4 Compound 4

Achiral component T of the invention may also contain at least one compound 4 represented by formula (4) in addition to compound 1 and compound 2 or compound 3. More specifically, in achiral component T, the invention includes a case where achiral component T is composed of one compound as compound 4, and also a case where achiral component T contains a plurality of compounds represented by formula (4) as compound 4.

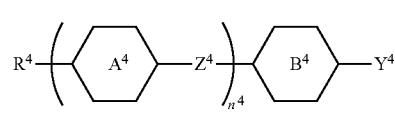

(4)

wherein, in formula (4), $R^4$ is hydrogen, alkyl having 1 to 12 carbons, alkenyl having 2 to 12 carbons, alkynyl having 2 to 12 carbons or alkoxy having 1 to 11 carbons; ring $A^4$ and ring $B^4$ are independently 1,4-cyclohexylene 1,4-phenylene, 2-fluoro-1,4-phenylene, 3-fluoro-1,4-phenylene, 2,5-difluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; $Z^4$ is a single bond, —O—, —COO—, —$CH_2CH_2$—, —$CH_2O$— and —$CF_2O$—; $Y^4$ is fluorine, chlorine, —$CF_3$, —$OCF_3$, alkyl having 1 to 12 carbons, alkenyl having 2 to 12 carbons or alkoxy having 1 to 11 carbons; and $n^4$ is 1 or 2.

$R^4$ in formula (4) is preferably hydrogen, alkyl having 1 to 12 carbons, alkenyl having 2 to 12 carbons, alkynyl having 2 to 12 carbons or alkoxy having 1 to 11 carbons.

In view of stability of the compound or a wide liquid crystal temperature range, ring $A^4$ or ring $B^4$ in formula (4) is preferably independently 1,4-cyclohexylene, 1,4-phenylene, 2-fluoro-1,4-phenylene, 3-fluoro-1,4-phenylene, 2,5-difluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl.

$Z^4$ in formula (4) is preferably a single bond, —O—, —COO—, —$CH_2CH_2$—, —$CH_2O$— and —$CF_2O$—, preferably a single bond for the wide liquid crystal temperature range and low viscosity, and preferably —$CF_2O$— for the large dielectric anisotropy.

$Y^4$ in formula (4) is preferably fluorine, chlorine, —$CF_3$, —$OCF_3$, alkyl having 1 to 12 carbons, alkenyl having 2 to 12 carbons or alkoxy having 1 to 11 carbons, and particularly preferably fluorine for the comparatively large dielectric anisotropy, and alkyl having 1 to 12 carbons, alkenyl having 2 to 12 carbons or alkoxy having 1 to 11 carbons for the low viscosity.

Compound 4 in which, in formula (4), $n^4$ is 1 is preferred for the low melting point and the small viscosity, and compound 4 in which $n^4$ is 2 is preferred for the comparatively high maximum temperature.

Compound 4 is preferably a compound represented by formulas (4-1) to (4-23).

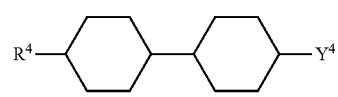

(4-1)

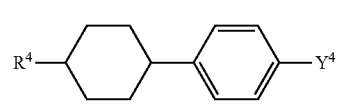

(4-2)

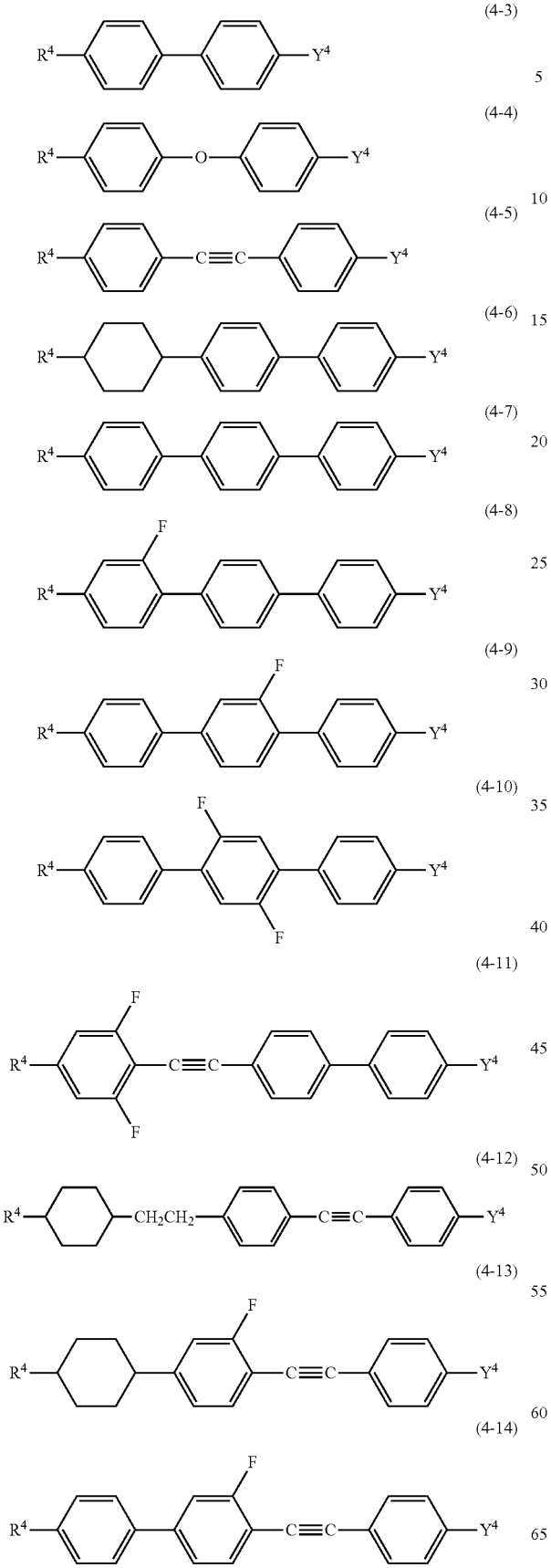
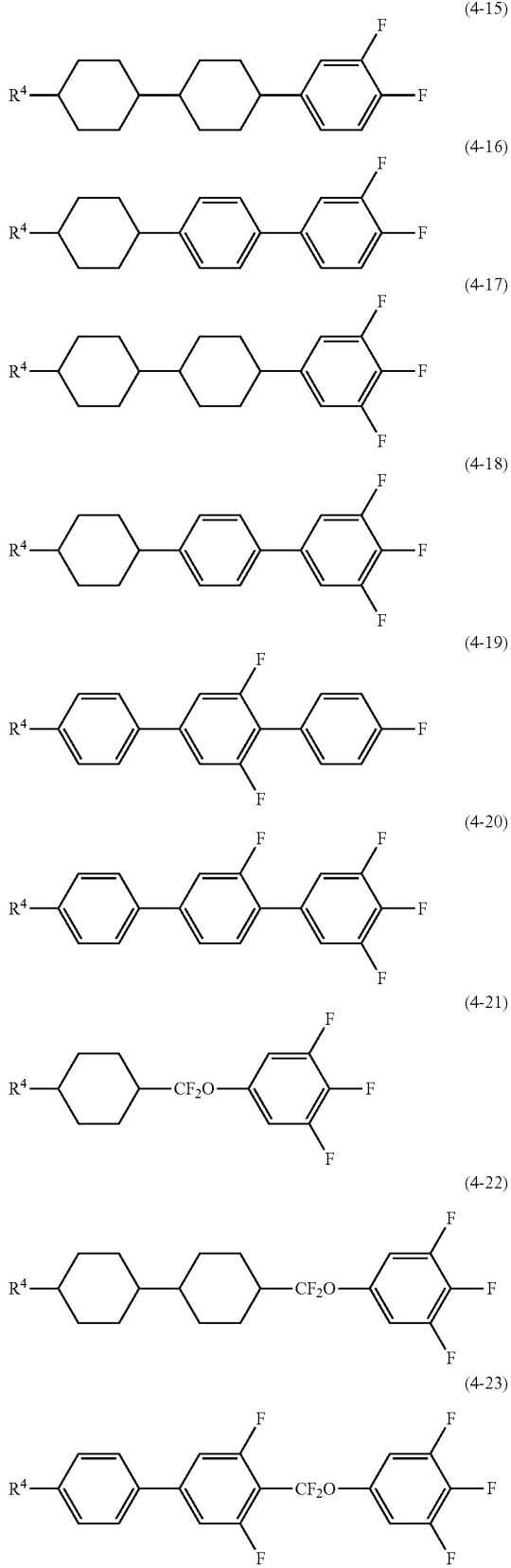
wherein, in the formulas, R⁴ is defined in a manner identical with the definition in compound 4.

Compound 4 is significantly stable physically and chemically under conditions in which the device is ordinarily used, and in compound 4 in which $Y^4$ is fluorine, chlorine, $-CF_3$ or $-OCF_3$, the clearing point is high, the dielectric anisotropy is large and the refractive index anisotropy is comparatively large, and therefore compound 4 is useful as a component for decreasing the drive voltage of the liquid crystal composition driven in the optically isotropic liquid crystal phase. In compound 4 in which $Y^4$ is alkyl having 1 to 12 carbons, alkenyl having 2 to 12 carbons or alkoxy having 1 to 11 carbons, the clearing point is high, and the compatibility with other compounds is comparatively good. A composition containing the compound is stable under conditions in which the device is ordinarily used. Accordingly, if compound 4 in the liquid crystal composition is used, the temperature range of the liquid crystal phase can be extended, and the composition can be used in the form of the display device in the wide temperature range.

2-1 Liquid Crystal Composition

The liquid crystal composition of the invention is a liquid crystal composition that contains achiral component T and the chiral agent, and the composition in which achiral component T contains at least one compound selected from the group of compounds represented by formula (1) (compound 1) as the first component and at least one compound selected from the group of compounds represented by formula (2) and formula (3) (compound 2 and compound 3) as the second component to develop the optically isotropic liquid crystal phase. Moreover, an optically isotropic liquid crystal composition may contain the antioxidant, the ultraviolet light absorbent, the stabilizer or the like in addition to achiral component T and the chiral agent.

The invention includes a case where, in achiral component T, the first component contains one compound as compound 1, and also a case where the first component contains two or more compounds as compound 1. In a similar manner, the invention includes a case where the second component contains one compound as compound 2 and/or compound 3, and also a case where the second component contains two or more compounds as compound 2 and/or compound 3.

Further, achiral component T contains one or more compounds represented by compound 4 when necessary. Compounds 1 to 4 are liquid crystalline.

The first component is contained preferably in about 1% by weight to about 30% by weight in total, further preferably in about 3% by weight to about 25% by weight in total, and particularly preferably in about 5% by weight to about 20% by weight in total, based on the total amount of the liquid crystal composition.

The second component is contained preferably in about 50% by weight to about 95% by weight in total, further preferably in about 60% by weight to about 95% by weight in total, and particularly preferably in about 65% by weight to about 90% by weight in total, based thereon.

The third component is contained preferably in about 1% by weight to about 30% by weight in total, further preferably in about 3% by weight to about 25% by weight in total, and particularly preferably in about 5% by weight to about 20% by weight in total, based thereon.

3 Optically Isotropic Liquid Crystal Composition

The liquid crystal composition of the invention includes an aspect of a composition containing achiral component T and the chiral agent to develop the optically isotropic liquid crystal phase (optically isotropic liquid crystal composition).

3-1 Achiral Component T

Achiral component T contained in the optical isotropy liquid crystal composition of the invention preferably contains compound 1 and compound 2 and/or compound 3, particularly preferably contains all of compound 1, compound 2 and compound 3, and further can contain compound 4 according to properties to be required.

3-2 Chiral Agent

The chiral agent contained in the optically isotropic liquid crystal composition or the like according to the invention is an optically active compound, and preferably composed of a compound selected from compounds having no radically polymerizable group.

As the chiral agent used in the liquid crystal composition of the invention, a compound having large helical twisting power is preferred. In the compound having the large helical twisting power, an amount of addition required for obtaining a desired pitch can be minimized, and therefore a rise of the drive voltage can be suppressed, and such a compound is advantageous in practical use. Specifically, compounds represented by formulas (K1) to (K6) are preferred. In addition, in formulas (K4) to (K6), a binaphthyl group or an octahydronaphthyl group is an optically active moiety, and chirality of the chiral agent does not matter.

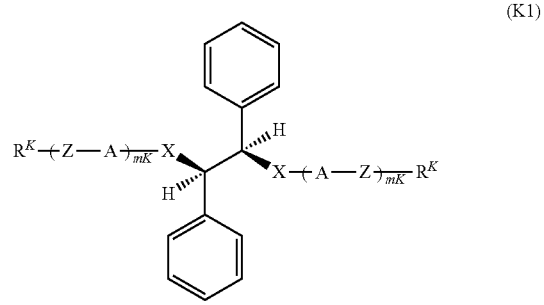

(K1)

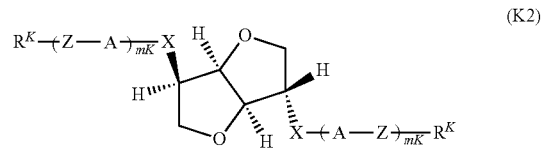

(K2)

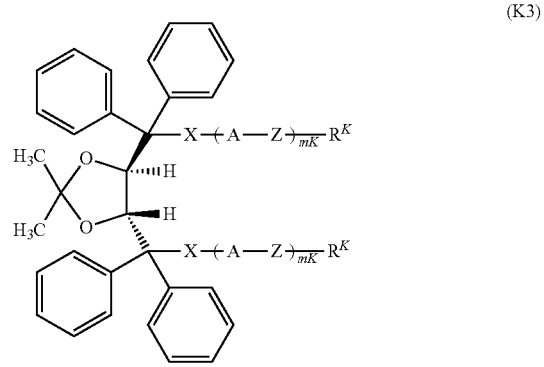

(K3)

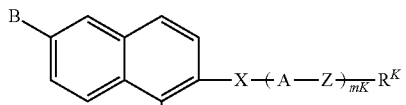
(K4)

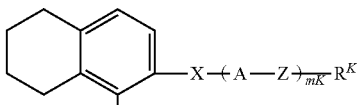
(K6)

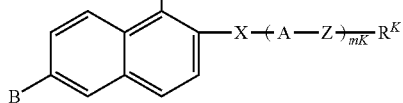
(K5)

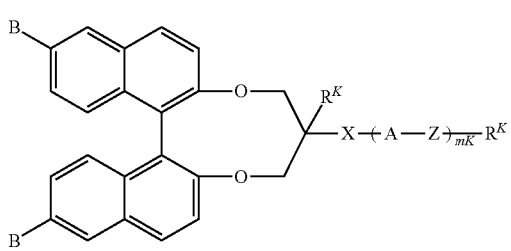

wherein, in the formulas, $R^K$, A, B, Z, X and mK are defined in a manner identical with the definition in item 9 described above.

In the compounds, as the chiral agent to be added to the liquid crystal composition, formula (K4-1) to formula (K4-6) included in formula (K4), formula (K5-1) to formula (K5-3) included in formula (K5), and formula (K6-1) to formula (K6-6) included in formula (K6) are preferred, and formula (K4-5), formula (K5-1) to formula (K5-3) and formula (K6-5) to formula (K6-6) are further preferred.

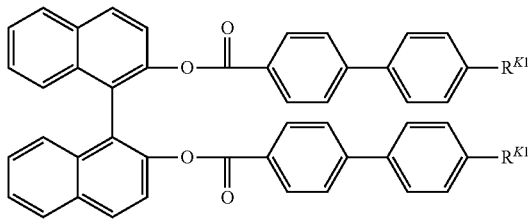
(K4-1)

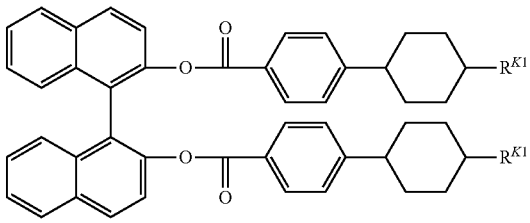
(K4-2)

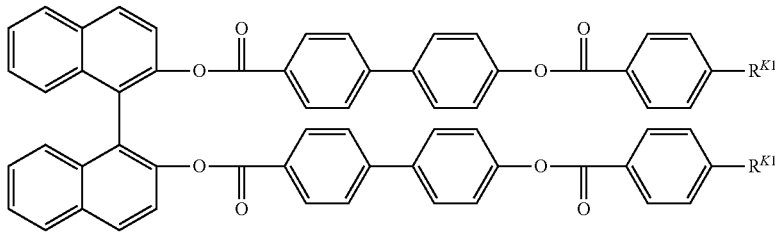
(K4-3)

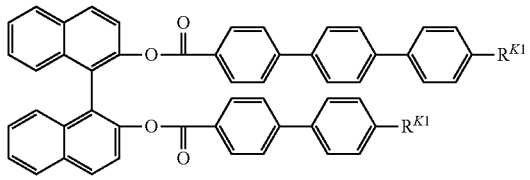
(K4-4)

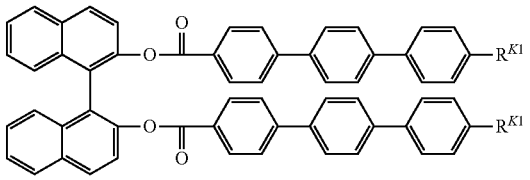
(K4-5)

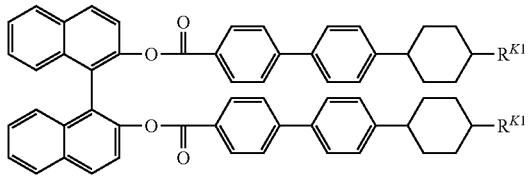
(K4-6)

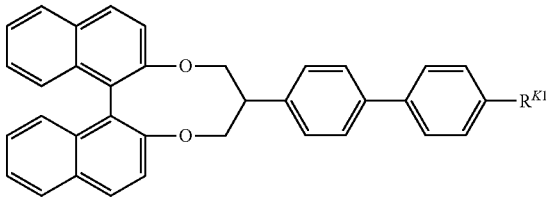
(K5-1)

-continued (K5-2)
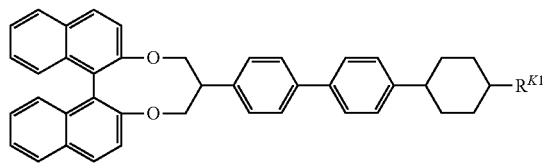

(K5-3)
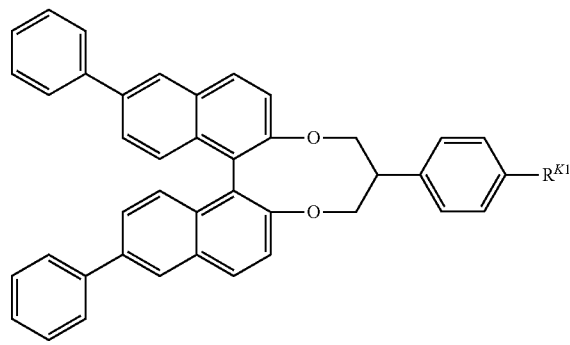

(K6-1)
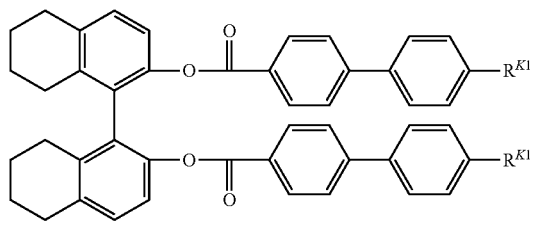

(K6-2)
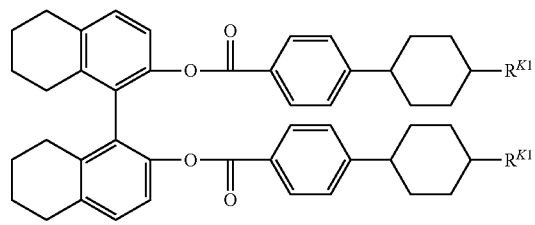

(K6-3)
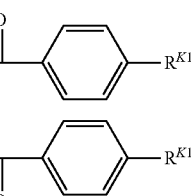

(K6-4)
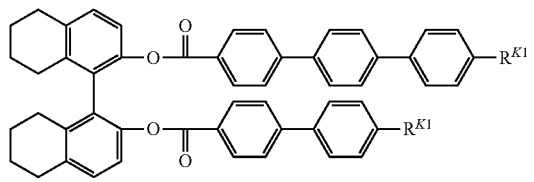

(K6-5)
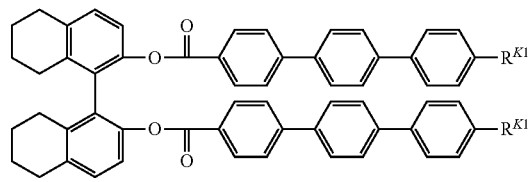

(K6-6)
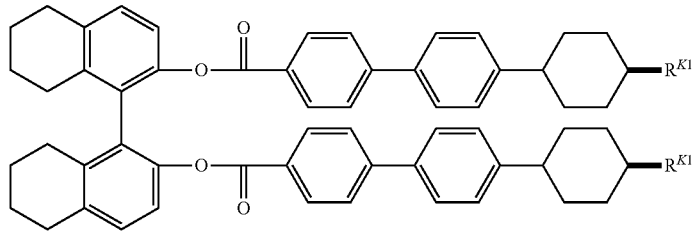

wherein, in the formulas, $R^{K1}$ is independently alkyl having 3 to 10 carbons or alkoxy having 3 to 10 carbons, and at least one or more pieces of —$CH_2$—$CH_2$— in the alkyl or the alkoxy may be replaced by —CH=CH—.

As the chiral agent to be contained in the liquid crystal composition, one compound may be used or a plurality of compounds may be used.

In order to facilitate development of the optically isotropic liquid crystal phase, the chiral agent is contained preferably in about 1 to 40% by weight, further preferably in about 3 to 25% by weight, and particularly preferably in about 3 to 15% by weight, based on the total weight of the liquid crystal composition of the invention.

3-3 Optically Isotropic Liquid Crystal Phase

An expression "liquid crystal composition has optical isotropy" herein means that the liquid crystal composition exhibits the optical isotropy macroscopically because arrangement of liquid crystal molecules is isotropic, in which liquid crystal order is microscopically present. "Pitch based on the liquid crystal order of the liquid crystal composition microscopically (hereinafter, occasionally referred to simply as a pitch)" is preferably about 700 nanometers or less, further preferably about 500 nanometers or less, and most preferably about 350 nanometers or less.

"Non-liquid crystal isotropic phase" herein means a generally defined isotropic phase, more specifically, a disordered phase, and an isotropic phase in which, even if an area in which a local order parameter is not zero is produced, the area is caused by a fluctuation. For example, an isotropic phase developed on a higher temperature side of the nematic phase corresponds to the non-liquid crystal isotropic phase herein. A similar definition is applied to chiral liquid crystals herein.

"Optically isotropic liquid crystal phase" herein represents a phase having the optically isotropic liquid crystal phase developed without fluctuation, and a phase having a platelet texture developed (blue phase in a narrow sense) is one example thereof.

Unless otherwise noted, the nematic phase herein means the nematic phase including no chiral nematic phase in the narrow sense.

In the optically isotropic liquid crystal composition of the invention, the platelet texture typical to the blue phase may not be occasionally observed under observation by means of a polarizing microscope although the liquid crystal composition has the optically isotropic liquid crystal phase. Then, a phase having the platelet texture developed herein is referred to as the blue phase, and the optically isotropic liquid crystal phase including the blue phase is referred to as the optically isotropic liquid crystal phase. More specifically, the blue phase is included in the optically isotropic liquid crystal phase.

In general, the blue phases are classified into three kinds, namely, blue phase I, blue phase II and blue phase III, and all of the three kinds of blue phases are optically active, and isotropic. In the blue phase of blue phase I or blue phase II, two or more kinds of diffracted light resulting from Bragg reflection from different lattice planes are observed. The blue phase is generally observed between the non-liquid crystal isotropic phase and a chiral nematic phase.

"State in which the optically isotropic liquid crystal phase does not exhibit diffracted light having two or more colors" means that the optically isotropic liquid crystal phase has almost monochrome in everywhere in which the platelet texture to be observed in blue phase I and blue phase II is not observed. In the optically isotropic liquid crystal phase that exhibits no diffracted light having two or more colors, uniformity of contrast in the plane is unnecessary.

The optically isotropic liquid crystal phase that exhibits no diffracted light having two or more colors has advantages in which intensity of reflected light by Bragg reflection is suppressed, or reflection is shifted to a side of a lower wavelength.

Moreover, in a liquid crystal medium that reflects visible light, color may occasionally become a problem in utilization in the farm of the display device, but in liquid crystals that exhibit no diffracted light having two or more colors, a reflection wavelength is shifted to a lower wavelength, and therefore reflection of visible light can be allowed to disappear by a pitch longer than a pitch of the blue phase in the narrow sense (phase having the platelet texture developed).

In the liquid crystal composition containing achiral component T and the chiral agent according to the invention, the chiral agent is added preferably at a concentration to be about 700 nanometers or less in the pitch. In addition, the composition that develops the nematic phase contains compound 1 and compound 2 or compound 3, and when necessary, other components.

Moreover, the optically isotropic liquid crystal composition of the invention can also be obtained by adding the chiral agent to the composition having the chiral nematic phase and no optically isotropic liquid crystal phase. In addition, a composition having the chiral nematic phase and no optically isotropic liquid crystal contains compound 1 and compound 2 or compound 3, and the optically active compound, and when necessary, other components. On the above occasion, in order to allow no development of the optically isotropic liquid crystal phase, the chiral agent is added preferably at a concentration to be about 700 nanometers or more in the pitch. Here, as the agent to be added, formulas (K1) to (K5) as the compound having large helical twisting power as described above can be used, and a compound represented by formulas (K2-1) to (K2-8), formulas (K4-1) to (K4-6), formulas (K5-1) to (K5-3) or formulas (K6-1) to (K6-6) is further preferably used.

The temperature range in which the liquid crystal composition of the preferred aspect according to the invention develops the optically isotropic liquid crystal phase can be extended by adding the chiral agent to the liquid crystal composition in which the temperature range of coexistence of the nematic phase or the chiral nematic phase and the isotropic phase is wide to develop the optically isotropic liquid crystal phase. For example, the composition that develops the optically isotropic liquid crystal phase in the wide temperature range can be prepared by mixing a liquid crystal compound having a high clearing point and a liquid crystal compound having a low clearing point to prepare a liquid crystal composition in which the temperature range of coexistence of the nematic phase and the isotropic phase is wide in the wide temperature range, and adding the chiral agent thereto.

As the liquid crystal composition having the wide temperature range of coexistence of the nematic phase or the chiral nematic phase and the isotropic phase, a liquid crystal composition in which a difference between the maximum temperature and the minimum temperature in which the chiral nematic phase and the non-liquid crystal isotropic phase coexist is 3 to 150° C. is preferred, and a liquid crystal composition in which a difference is 5 to 150° C. is further preferred. Moreover, a liquid crystal compound in which a difference between the maximum temperature and the minimum temperature in which the nematic phase and the non-liquid crystal isotropic phase coexist is 3 to 150° C. is also preferred.

If an electric field is applied to the liquid crystal medium of the invention in the optically isotropic liquid crystal phase, electric birefringence is caused, but the birefringence does not necessarily result from the Kerr effect. Electric birefringence in the optically isotropic liquid crystal phase becomes larger as the pitch becomes longer, and therefore as long as requirements of other optical characteristics (transmittance, diffraction wavelength or the like) are satisfied, the electric birefringence can be increased by adjusting a kind and a content of the chiral agent and setting a long pitch.

3-4 Any Other Component

The liquid crystal composition of the invention may further contain a solvent, a monomer, a polymer substance, a polymerization initiator, an antioxidant, an ultraviolet light absorbent, a curing agent, a stabilizer, a dichroic dye, a photochromic compound or the like within the range in which the characteristics of the composition are not significantly influenced.

Moreover, specific examples of the dichroic dye to be used in the liquid crystal composition of the invention include a merocyanine type, a styryl type, an azo type, an azomethine type, an azoxy type, a quinophthalone type, an anthraquinone type and a tetrazine type.

4 Optically Isotropic Polymer-liquid Crystal Composite Material 4-1 Polymer-liquid Crystal Composite Material The polymer-liquid crystal composite material of the invention is a composite material containing the liquid crystal composition and the polymer to optically exhibit isotropy, and can be used in the optical device driven in the optically isotropic liquid crystal phase. The liquid crystal composition contained in the polymer-liquid crystal composite material of the invention is the liquid crystal composition of the invention.

"Polymer-liquid crystal composite material" herein is not particularly limited as long as the composite material contains both the liquid crystal composition and the polymer compound, but may be in a state in which the polymer is subjected to phase separation from the liquid crystal composition in a state in which the polymer is not partially or wholly dissolved into the liquid crystal composition, the solvent or the like.

The optically isotropic polymer-liquid crystal composite material according to the preferred aspect of the invention can develop the optically isotropic liquid crystal phase in the wide temperature range. Moreover, the polymer-liquid crystal composite material according to the preferred aspect of the invention has a significantly high response velocity. Moreover, the polymer-liquid crystal composite material according to the preferred aspect of the invention can be preferably used for the optical device such as the display device, based on the effects.

4-2 Polymer Compound

The composite material of the invention can also be manufactured by mixing the optically isotropic liquid crystal composition and the polymer obtained by allowing polymerization in advance, but is preferably manufactured by mixing a low molecular weight monomer, a macro monomer, an oligomer or the like (hereinafter, collectively referred to as "monomer or the like") serving as a material of the polymer, and chiral liquid crystal composition CLC, and then performing a polymerization reaction in the mixture. The mixture containing the monomer or the like and the liquid crystal composition is referred to as "polymerizable monomer-liquid crystal mixture" herein. "Polymerizable monomer-liquid crystal mixture" may contain, when necessary, a polymerization initiator, a curing agent, a catalyst, a stabilizer, a dichroic dye or a photochromic compound or the like as described later in the range in which advantageous effects of the invention are not adversely affected. For example, the polymerizable monomer-liquid crystal mixture of the invention may contain, when necessary, 0.1 to 20 parts by weight of the polymerization initiator based on 100 parts by weight of the polymerizable monomer. "Polymerizable monomer-liquid crystal mixture" is essentially the liquid crystal medium when the mixture is polymerized in the blue phase, but when the mixture is polymerized in the isotropic phase, the mixture is not necessarily the liquid crystal medium.

Polymerization temperature preferably includes temperature at which the polymer-liquid crystal composite material exhibits high transparency and isotropy.

The polymerization temperature further preferably includes temperature at which the mixture of the monomer and the liquid crystal material develops the isotropic phase or the blue phase, and the polymerization is terminated in the isotropic phase or the optically isotropic liquid crystal phase. More specifically, the polymerization temperature is preferably adjusted to temperature at which, after the polymerization, the polymer-liquid crystal composite material does not substantially scatter light on a side of a wavelength longer than a wavelength of visible light and develops an optically isotropic state.

As a raw material of the polymer that constitutes the composite material of the invention, for example, the low molecular weight monomer, the macromonomer or the oligomer can be used, and a polymer raw material monomer herein is used in a meaning of including the low molecular weight monomer, the macromonomer and the oligomer. Moreover, the polymer obtained preferably has a three-dimensional crosslinking structure, and therefore a polyfunctional monomer having two or more polymerizable functional groups is preferably used as the raw material monomer of the polymer. The polymerizable functional group is not particularly limited, but specific examples include an acrylic group, a methacrylic group, a glycidyl group, an epoxy group, an oxetanyl group and a vinyl group, but preferably the acrylic group and the methacrylic group from a viewpoint of a rate of polymerization. Among the raw material monomers of the polymer, if a monomer having two or more polymerizable functional groups is contained in the monomer in about 10% by weight or more, high-level transparency and isotropy are easily developed in the composite material of the invention, and therefore such a case is preferred.

Moreover, in order to obtain a preferred composite material, the polymer preferably has a mesogen moiety, and a raw material monomer having the mesogen moiety can be partially or wholly used as the raw material monomer of the polymer.

4-2-1 Monofunctional, Bifunctional or Trifunctional Monomer Having Mesogen Moiety A monofunctional or bifunctional monomer having the mesogen moiety is not particularly limited structurally, and specific examples include a compound represented by formula (M1) or formula (M2) described below.

$$R^a-Y-(A^M-Z^M)_{m1}-A^M-Y-R^b \qquad (M1)$$

$$R^b-Y-(A^M-Z^M)_{m1}-A^M-Y-R^b \qquad (M2)$$

In formula (M1), $R^a$ is hydrogen, halogen, —C≡N, —N=C=O, —N=C=S or alkyl having 1 to 20 carbons, and in the alkyl, at least one piece of —CH$_2$— may be replaced by —O—, —S—, —CO—, —COO— or —OCO—, at least one piece of —CH$_2$—CH$_2$— in the alkyl may be replaced by —CH=CH—, —CF=CF— or —C≡C—, and in the alkyl groups in which at least one piece of —CH$_2$— in the alkyl is replaced by —O—, —S—, —COO— or —OCO— or in the alkyl groups in which at least one piece of —CH$_2$—CH$_2$— in the alkyl is replaced by —CH=CH— or —C≡C—, at least one hydrogen may be replaced by halogen or —C≡N. $R^b$ is each independently a polymerizable group represented by formula (M3-1) to formula (M3-7).

(M3-1)

(M3-2)

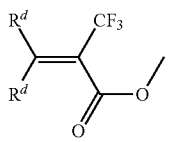

(M3-3)

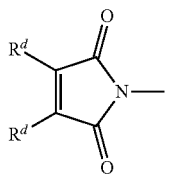

(M3-4)

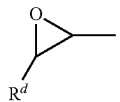

(M3-5)

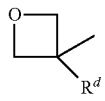

(M3-6)

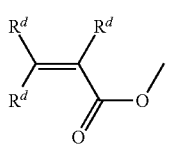

(M3-7)

Preferred $R^a$ is hydrogen, halogen, —C≡N, —CF$_3$, —CF$_2$H, —CFH$_2$, —OCF$_3$, —OCF$_2$H, alkyl having 1 to 20 carbons, alkoxy having 1 to 19 carbons, alkenyl having 2 to 21 carbons and alkynyl having 2 to 21 carbons. Particularly preferred $R^a$ is —C≡N, alkyl having 1 to 20 carbons and alkoxy having 1 to 19 carbons.

In formula (M2), $R^b$ is each independently a polymerizable group represented by formulas (M3-1) to (M3-7).

Here, $R^d$ in formulas (M3 -1) to (M3-7) is each independently hydrogen, halogen or alkyl having 1 to 5 carbons, and in the alkyl, at least one hydrogen may be replaced by halogen. Preferred $R^d$ is hydrogen, halogen and methyl. Particularly preferred $R^d$ is hydrogen, fluorine and methyl.

Moreover, the monomers represented by formula (M3-2), formula (M3-3), formula (M3-4) and formula (M3-7) are preferably polymerized by radical polymerization. The monomers represented by formula (M3-1), formula (M3-5) and formula (M3-6) are preferably polymerized by cationic polymerization. If a small amount of radicals or cation active species is generated in a reaction system in all, the polymerization starts. The polymerization initiator can be used for the purpose of accelerating generation of the active species. Light or heat can be used for generation of the active species, for example.

In formulas (M1) and (M2), $A^M$ is each independently an aromatic or non-aromatic 5-membered ring or 6-membered ring, or a. condensed ring having 9 or more carbons, but —CH$_2$— in the ring may be replaced by —O—, —S—, —NH— or —NCH$_3$—, and —CH= in the ring may be replaced by —N=, and a hydrogen atom on the ring may be replaced by halogen, and alkyl or alkyl halide having 1 to 5 carbons. Specific examples of preferred $A^M$ include 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl, and in the rings, at least one piece of —CH$_2$— may be replaced by —O—, at least one piece of —CH= may be replaced by —N=, and in the rings, at least one hydrogen may be replaced by halogen, alkyl having 1 to 5 carbons or alkyl halide having 1 to 5 carbons.

In taking into account the stability of the compound, —CH$_2$—O—CH$_2$—O— in which oxygen and oxygen are not adjacent is preferred to —CH$_2$—O—O—CH$_2$— in which oxygen and oxygen are adjacent. A same rule applies also to sulfur.

Above all, specific examples of particularly preferred $A^M$ include 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl, and pyrimidine-2,5-diyl. In addition, with regard to a configuration of 1,4-cyclohexylene and 1,3-dioxane-2,5-diyl, trans is preferred to cis.

Because 2-fluoro-1,4-phenylene is structurally identical with 3-fluoro-1,4-phenylene, the latter is not illustrated. A same rule applies also to a relationship between 2,5-difluoro-1,4-phenylene and 3,6-difluoro-1,4-phenylene, or the like.

In formulas (M1) and (M2), Y is each independently a single bond or alkylene having 1 to 20 carbons, and in the alkylene, at least one piece of —CH$_2$— may be replaced by —O— and —S—, and at least one piece of —CH$_2$—CH$_2$— in the alkyl may be replaced by —CH=CH—, —C≡C—, —COO— or —OCO—. Preferred Y is a single bond, —(CH$_2$)$_{m2}$—, —O(CH$_2$)$_{m2}$— and —(CH$_2$)$_{m2}$O— (in the formulas described above, m2 is an integer from 1 to 20). Particularly preferred Y is a single bond, —(CH$_2$)$_{m2}$—, —O(CH$_2$)$_{m2}$— and —(CH$_2$)$_{m2}$O— (in the formulas described above, m2 is an integer from 1 to 10). In view of the stability of the compound, —Y—$R^a$ and —Y—$R^b$ do not have —O—O—, —O—S—, —S—O— or —S—S— in the groups, preferably.

In formulas (M1) and (M2), $Z^M$ is each independently a single bond, —(CH$_2$)$_{m3}$—, —O(CH$_2$)$_{m3}$—, —(CH$_2$)$_{m3}$O—, —O(CH$_2$)$_{m3}$O—, —CH=CH—, —C≡C—, —COO—, —OCO—, —(CF$_2$)$_2$—, —(CH$_2$)$_2$—COO—, —OCO—(CH$_2$)$_2$—, —CH=CH—COO—, —OCO—CH=CH—, —C≡C—COO—, —OCO—C≡C—, —CH=CH—(CH$_2$)$_2$—, —(CH$_2$)$_2$—CH=CH—, —CF=CF—, —C≡C—CH=CH—, —CH=CH—C≡C—, —OCF$_2$—(CH$_2$)$_2$—, —(CH$_2$)$_2$—CF$_2$O—, —OCF$_2$— or —CF$_2$O— (in the formulas described above, m3 is an integer from 1 to 20).

Preferred $Z^M$ is a single bond, —(CH$_2$)$_{m3}$—, —O(CH$_2$)$_{m3}$—, —(CH$_2$)$_{m3}$O—, —CH=CH—, —C≡C—, —COO—, —OCO—, —(CH$_2$)$_2$—COO—, —OCO—(CH$_2$)$_2$—, —CH=CH—COO—, —OCO—CH=CH—, —OCF$_2$— and —CF$_2$O—.

In formulas (M1) and (M2), m1 is an integer from 1 to 6. Preferred m1 is an integer from 1 to 3. When m1 is 1, the formulas represent a bicyclic compound having two rings such as a 6-membered ring. When m1 is 2 and 3, the formulas represent a tricyclic compound and a tetracyclic compound, respectively. For example, when m1 is 1, two pieces of $A^M$ may be identical or different. Moreover, for example, when m1 is 2, three pieces of $A^M$ (or two pieces of $Z^M$) maybe identical or different. When m1 is 3 to 6, a same rule applies also thereto. A same rule applies also to $R^a$, $R^b$, $R^d$, $Z^M$, $A^M$ and Y.

Even if compound (M1) represented by formula (M1) and compound (M2) represented by formula (M2) contain an isotope such as $^2$H (deuterium) and $^{13}$C in an amount higher than natural abundance, compound (M1) and compound (M2) can be preferably used because of having similar characteristics.

Specific examples of further preferred compound (M1) and further preferred compound (M2) include compounds (M1-1) to (M1-41) and compounds (M2-1) to (M2-27) as represented by formulas (M1-1) to (M1-41) and formulas (M2-1) to (M2-27). In the compounds, definitions of $R^a$, $R^b$, $R^d$, $Z^M$, $A^M$, Y and p are identical with definitions thereof in formula (M1) and formula (M2) as described in the aspect of the invention.

Partial structure described below in compounds (M1-1) to (M1-41) and (M2-1) to (M2-27) will be described. Partial structure (a1) represents 1,4-phenylene in which at least one hydrogen is replaced by fluorine. Partial structure (a2) represents 1,4-phenylene in which at least one hydrogen may be replaced by fluorine. Partial structure (a3) represents 1,4-phenylene in which at least one hydrogen may be replaced by any one of fluorine or methyl. Partial structure (a4) represents fluorene in which hydrogen in 9-position may be replaced by methyl.

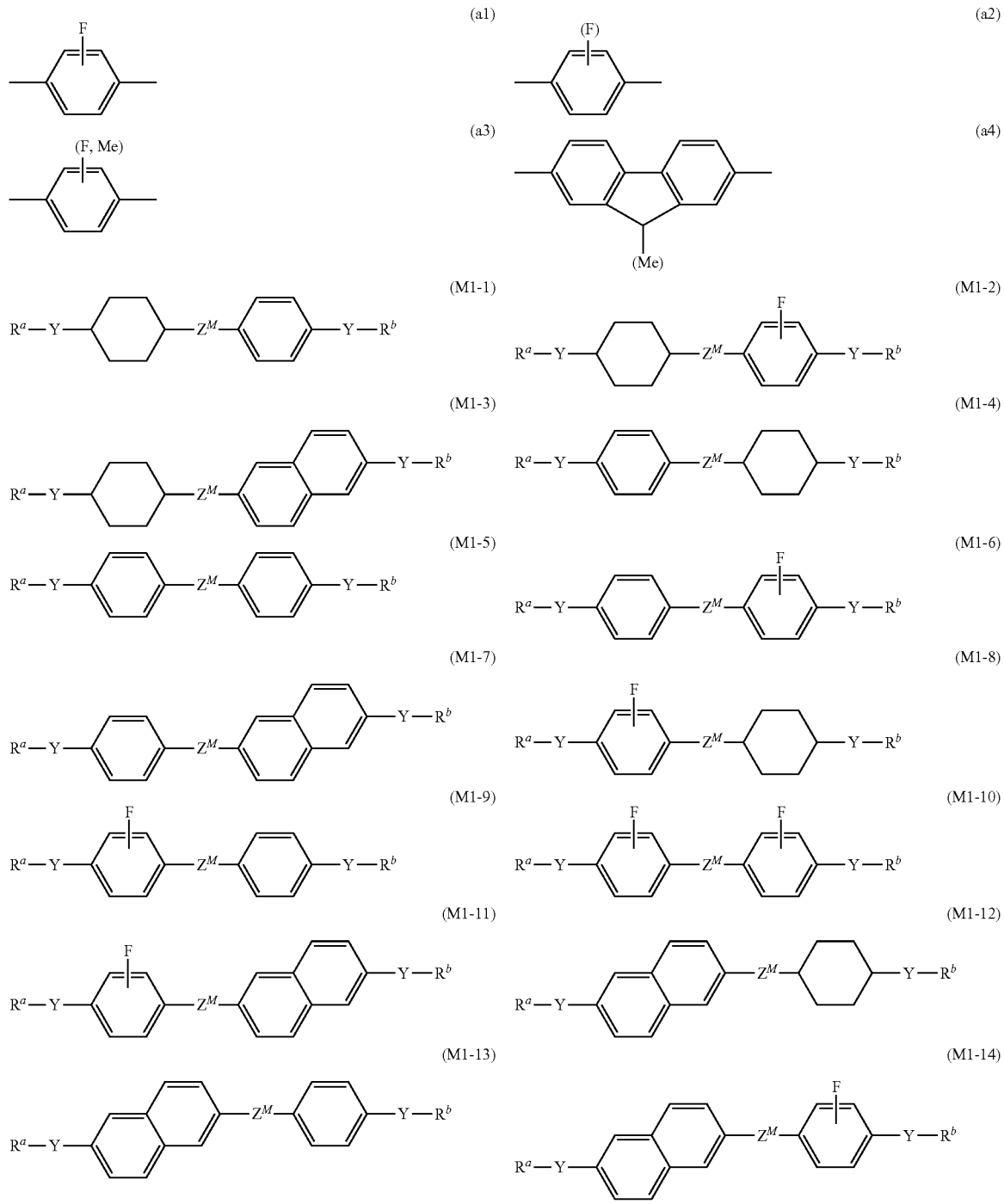

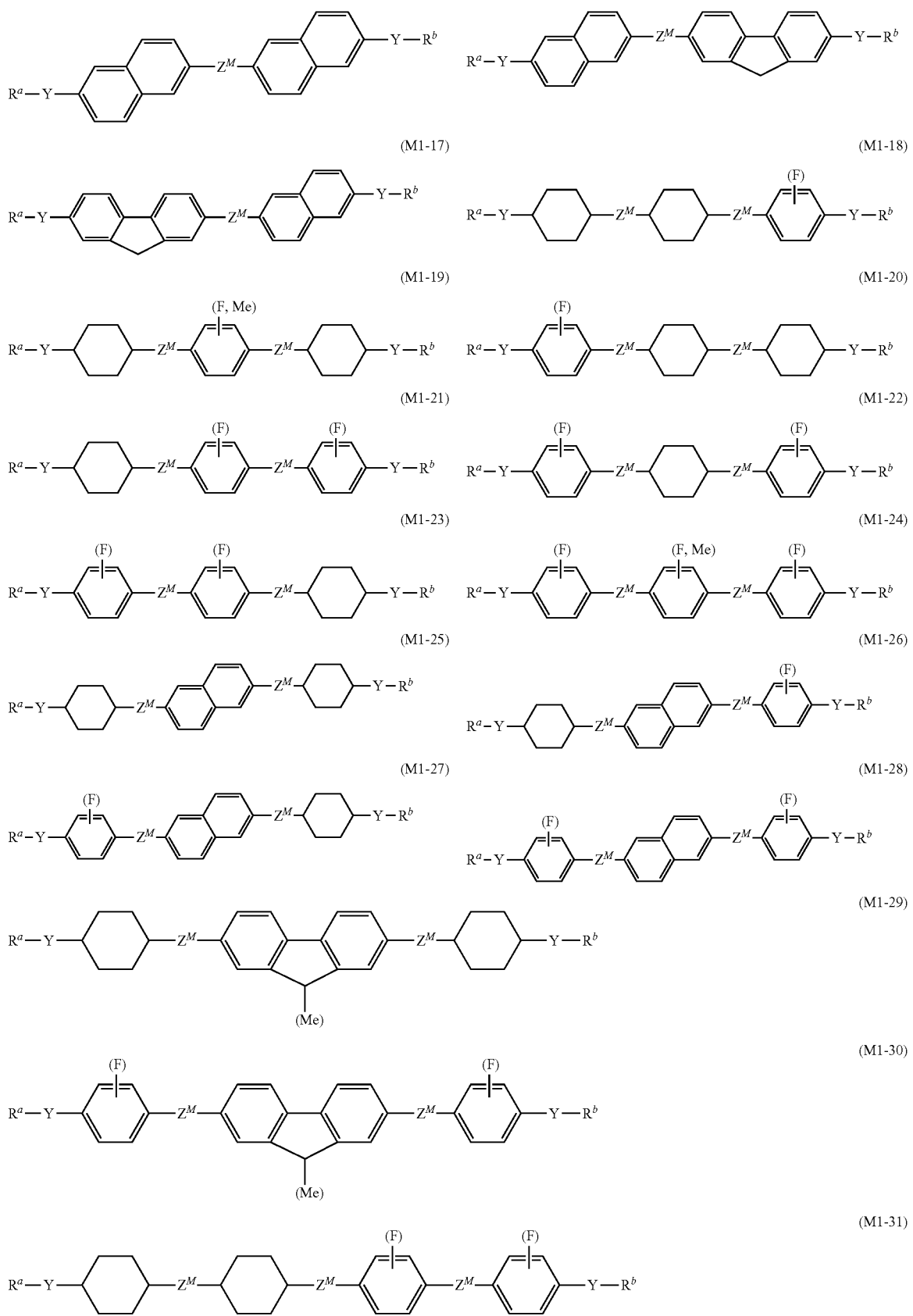

-continued
(M1-32)
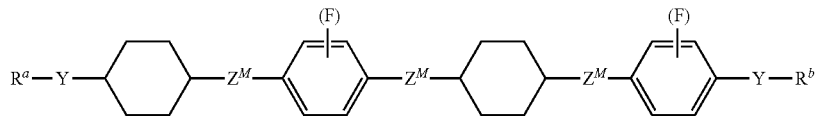
(M1-33)
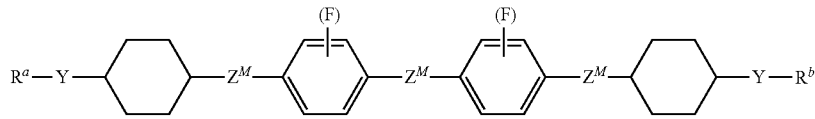
(M1-34)
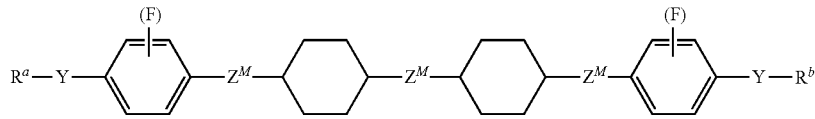
(M1-35)
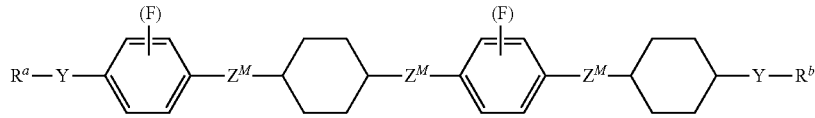
(M1-36)
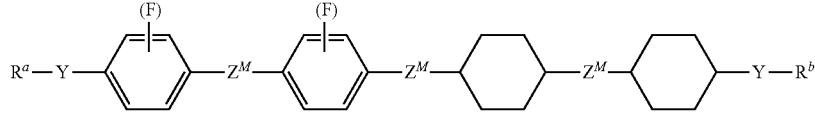
(M1-37)
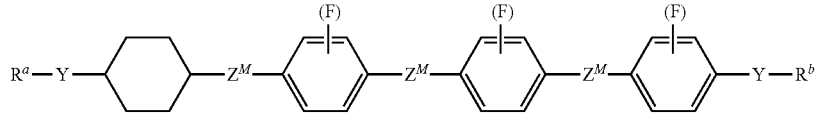
(M1-38)
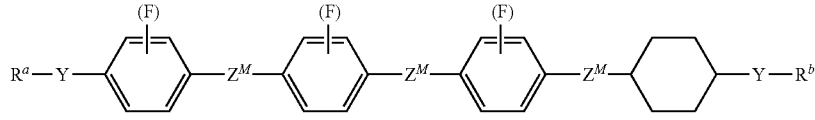
(M1-39)
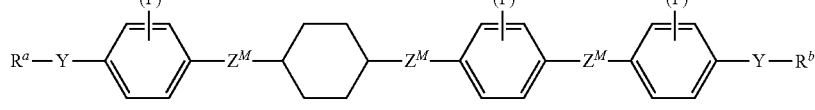
(M1-40)
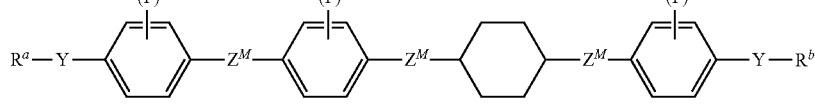
(M1-41)
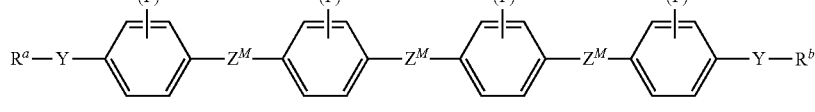
(M2-1)
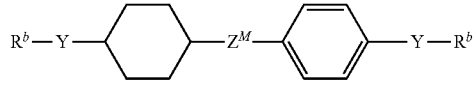
(M2-2)
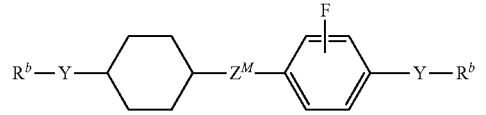
(M2-3)
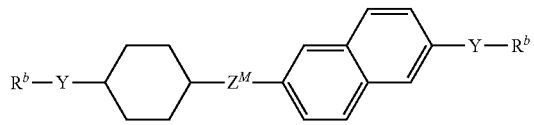
(M2-4)
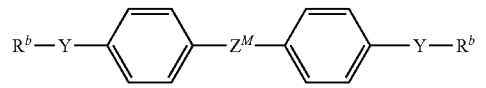

-continued
(M2-5)
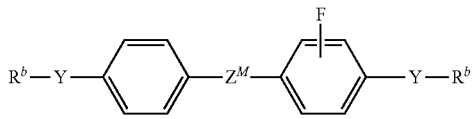
(M2-6)
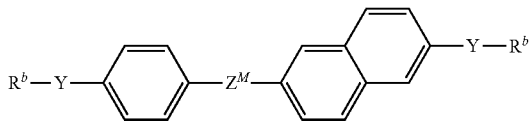
(M2-7)
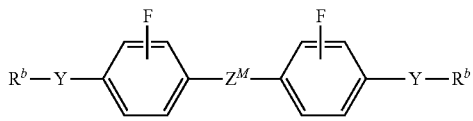
(M2-8)
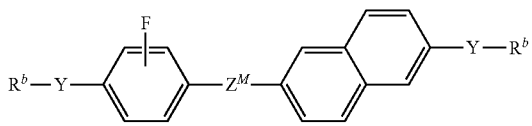
(M2-9)
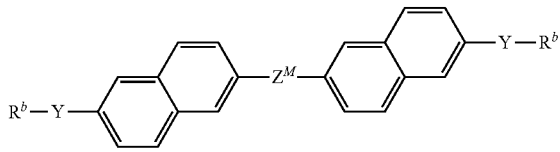
(M2-10)
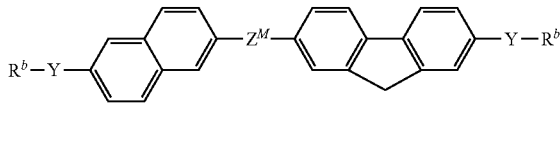
(M2-11)
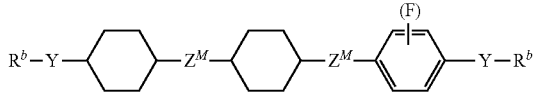
(M2-12)
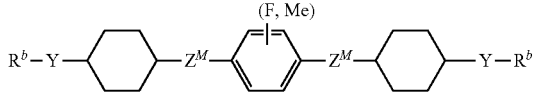
(M2-13)
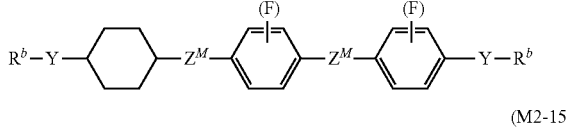
(M2-14)
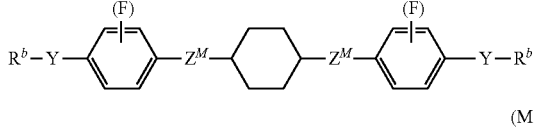
(M2-15)
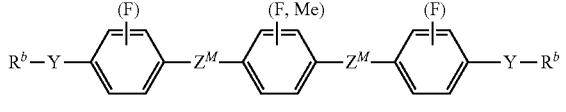
(M2-16)
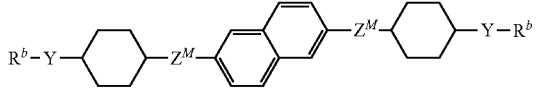
(M2-17)
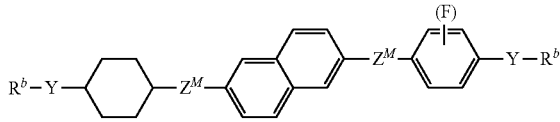
(M2-18)
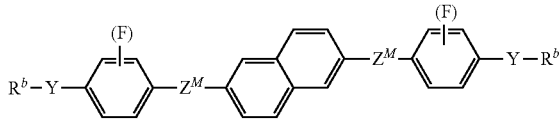
(M2-19)
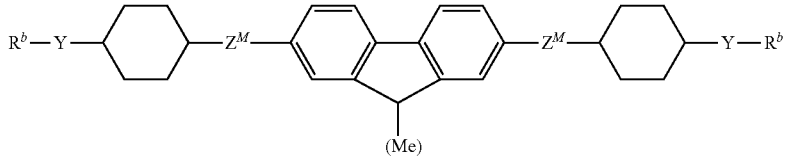
(M2-20)
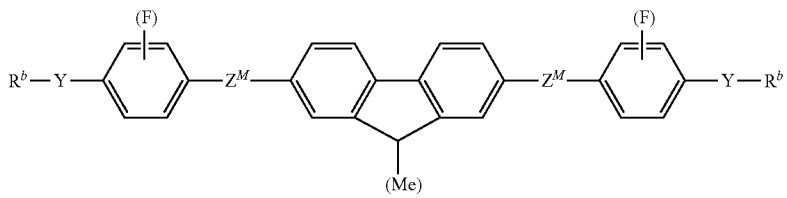
(M2-21)
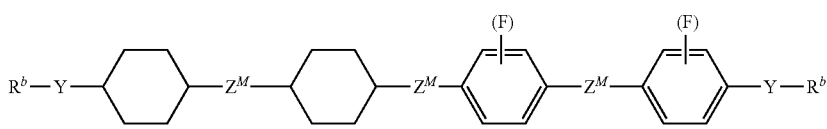

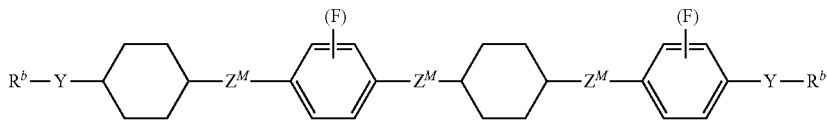
(M2-22)

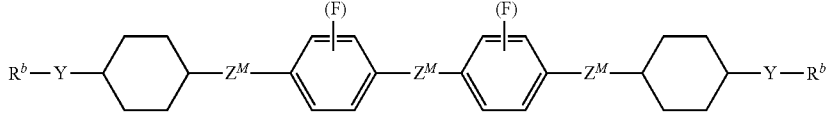
(M2-23)

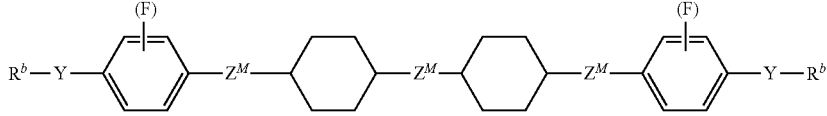
(M2-24)

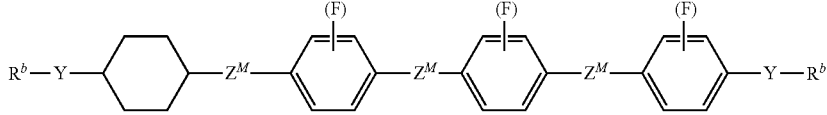
(M2-25)

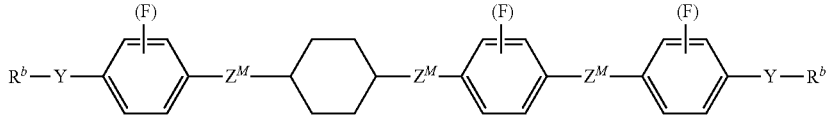
(M2-26)

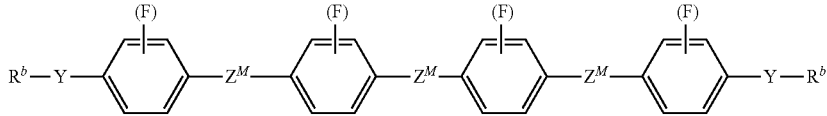
(M2-27)

A monomer having no mesogen moiety and a polymerizable compound other than monomers (M1) and (M2) having the mesogen moiety as described above can be used when necessary.

For the purpose of optimizing the optical isotropy of the polymer-liquid crystal composite material of the invention, a monomer having a mesogen moiety and three or more polymerizable functional groups can also be used. As the monomer having the mesogen moiety and three or more polymerizable functional groups, a publicly known compound can be preferably used, and specific examples include (M4-1) to (M4-3), and further specific examples include compounds described in JP 2000-327632 A, JP 2004-182949 A and JP 2004-59772 A. However, in (M4-1) to (M4-3), $R^b$, $Z^M$, Y and (F) are defined in a manner identical with the definitions described above.

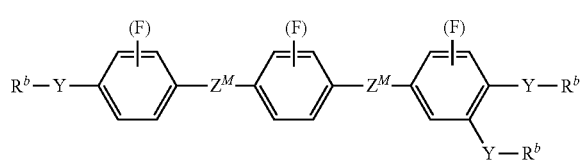
(M4-1)

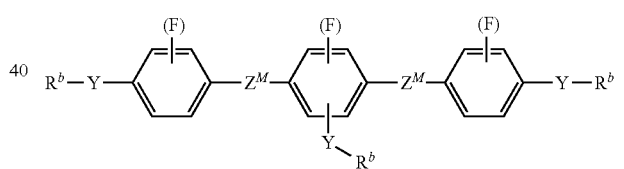
(M4-2)

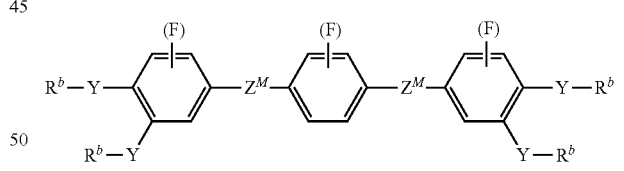
(M4-3)

4-2-2 Monomer Having No Mesogen Moiety and Having Polymerizable Functional Group Specific examples of a monomer having no mesogen moiety and having a polymerizable functional group include a straight-chain or branched-chain acrylate having 1 to 30 carbons, or a straight-chain or branched-chain diacrylate having 1 to 30 carbons, and specific examples of a monomer having three or more polymerizable functional groups include glycerol propoxylate (1 PO/OH) triacrylate, pentaerythritol propoxylate triacrylate, pentaerythritol triacrylate, trimethylolpropane ethoxylate triacrylate, trimethylolpropane propoxylate triacrylate, trimethylolpropane triacrylate, di (trimethylolpropane) tetraacrylate, pentaerythritol tetraacrylate, di (pentaerythritol) pentaacrylate, di (pentaerythritol) hexaacrylate and trimethylolpropane triacrylate, but are not limited thereto.

4-2-3 Polymerization Initiator

The polymerization reaction in manufacture of the polymer that constitutes the composite material of the invention is not particularly limited, and for example, photoradical polymerization, thermal radical polymerization, photocationic polymerization or the like is perfoimed.

Specific examples of a photoradical polymerization initiator that can be used in the photoradical polymerization include DAROCUR 1173 and 4265 (trade names for both, BASF Japan, Ltd.), and IRGACURE 184, 369, 500, 651, 784, 819, 907, 1300, 1700, 1800, 1850 and 2959 (trade names for all, BASF Japan, Ltd.).

Specific examples of a preferred thermal radical polymerization initiator that can be used in the thermal radical polymerization include benzoyl peroxide, diisopropyl peroxydicarbonate, t-butyl peroxy-2-ethylhexanoate, t-butyl peroxypivalate, t-butyl peroxydiisobutyrate, lauroyl peroxide, 2,2'-azobis(methyl isobutyrate) (MAIB), di-t-butyl peroxide (DTBPO), azobisisobutyronitrile (AIBN) and azobis (cyclohexanecarbonitrile) (ACN).

Specific examples of a photocationic polymerization initiator that can be used in the photocationic polymerization include diaryliodonium salt (hereinafter, referred to as "DAS") and a triarylsulfonium salt (hereinafter, referred to as "TAS").

Specific examples of DAS include diphenyliodonium tetrafluoroborate, diphenyliodonium hexafluorophosphonate, diphenyliodonium hexafluoroarsenate, diphenyliodonium trifluoromethane sulfonate, diphenyliodonium trifluoroacetate, diphenyliodonium-p-toluene sulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethane sulfonate, 4-methoxyphenylphenyliodonium trifluoroacetate and 4-methoxyphenylphenyliodonium-p-toluene sulfonate.

An improvement in sensitivity of DAS can also be achieved by adding a photosensitizer such as thioxanthone, phenothiazine, chlorothioxanthone, xanthone, anthracene, diphenylanthracene and rubrene to DAS.

Specific examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl) borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethane sulfonate, 4-methoxyphenyldiphenylsulfonium trifluoroacetate and 4-methoxyphenyldiphenylsulfonium-p-toluene sulfonate.

Specific examples of the trade names of the photocationic polymerization initiator include Cyracure UVI-6990, Cyracure UVI-6974, and Cyracure UVI-6992 (trade names, respectively, UCC Corporation), ADEKA Optomer SP-150, SP-152, SP-170, SP-172 (trade names, respectively, ADEKA Corporation), Rhodorsil Photoinitiator 2074 (trade name, Rhodia Japan, Ltd.), IRGACURE 250 (trade name, BASF Japan, Ltd.) and UV-9380C (trade name, GE Toshiba Silicones, Co., Ltd.).

4-2-4 Curing Agent or the Like

In manufacture of the polymer that constitutes the composite material of the invention, in addition to the monomer or the like and the polymerization initiator, one kind or two or more kinds of other preferred components, for example, the curing agent and the stabilizer may be added thereto.

As the curing agent, a conventionally publicly known latent curing agent that has been ordinarily used as a curing agent for an epoxy resin can be used. Specific examples of the latent curing agent for the epoxy resin include an amine curing agent, a novolak resin curing agent, an imidazole curing agent and an acid anhydride curing agent. Specific examples of the amine curing agent include aliphatic polyamine such as diethylenetriamine, triethylenetetramine, tetraethylenepentamine, m-xylenediamine, trimethylhexamethylenediamine, 2-methylpentamethylenediamine and diethylaminopropylamine, alicyclic polyamine such as isophoronediamine, 1,3-bisaminomethylcyclohexane, bis (4-aminocyclohexyl)methane, norbornenediamine, 1,2-diaminocyclohexane and Laromin, and aromatic polyamine such as diaminodiphenylmethane, diaminodiphenylethane and m-phenylenediamine.

Specific examples of the novolak resin curing agent include a phenol novolak resin and a bisphenol novolak resin. Specific examples of the imidazole curing agent include 2-methylimidazole, 2-ethylhexilimidazole 2-phenylimidazole and 1-cyanoethyl-2-phenylimidazolium trimellitate.

Specific examples of the acid anhydride curing agent include tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic anhydride and benzophenonetetracarboxylic dianhydride.

Moreover, a curing accelerator for promoting a curing reaction of the polymerizable compound having a glycidyl group, an epoxy group or an oxetanyl group and the curing agent may be further used. Specific examples of the curing accelerator include tertiary amines such as benzyldimethylamine, tris(dimethylaminomethyl)phenol and dimethylcyclohexylamine, imidazoles such as 1-cyanoethyl-2-ethyl-4-methylimidazole and 2-ethyl-4-methylimidazole, an organic phosphorus compound such as triphenylphosphine, quaternary phosphonium salts such as tetraphenylphosphonium bromide, diazabicycloalkenes such as 1,8-diazabicyclo[5.4.0]undecene-7 and an organic acid salt thereof, quaternary ammonium salts such as tetraethylammonium bromide and tetrabutylammonium bromide, and a boron compound such as boron trifluoride and triphenyl borate. The curing accelerators can be used alone or by mixing a plurality thereof.

Moreover, in order to prevent undesired polymerization during storage, for example, addition of the stabilizer is preferred. As the stabilizer, all the compounds known to those skilled in the art can be used. Typified examples of the stabilizer include 4-ethoxyphenol, hydroquinone and butylated hydroxytoluene (BHT).

4-3 Composition of Polymer-liquid Crystal Composite Material

A content of the liquid crystal composition in the polymer-liquid crystal composite material of the invention is preferably as high as possible if the content is within the range in which the composite material can develop the optically isotropic liquid crystal phase. The reason is that a value of the electric birefringence of the composite material of the invention becomes larger as the content of the liquid crystal composition is higher.

In the polymer-liquid crystal composite material of the invention, the content of the liquid crystal composition is preferably about 60 to about 99% by weight, further preferably about 60% by weight to about 98% by weight, and particularly preferably about 80% by weight to about 97% by weight, based on the composite material. Moreover, in the polymer-liquid crystal composite material of the invention, a content of the polymer is preferably about 1% by weight to about 40% by weight, further preferably about 2% by weight to about 40% by weight, and particularly preferably about 3% by weight to about 20% by weight, based on the composite material.

5 Optical Device

The optical device of the invention includes an optical device driven in the optically isotropic liquid crystal phase including the liquid crystal composition or the polymer-liquid crystal composite material (hereinafter, the liquid crystal composition and the polymer-liquid crystal composite material of the invention may be occasionally referred to generically as the liquid crystal medium).

The liquid crystal medium is optically isotropic when no electric field is applied, but when the electric field is applied, the optical anisotropy is caused in the liquid crystal medium, and optical modulation by the electric field can be made.

Specific examples of structure of a liquid crystal display device include, as shown in FIG. 1, the structure in which electrode 1 extended from a left side and electrode 2 extended from a right side are alternately arranged in electrodes of a comb-shaped electrode substrate. When a potential difference exists between electrode 1 and electrode 2, on the comb-shaped electrode substrate as shown in FIG. 1, if attention is paid to one electrode, a state in which electric fields in two directions, namely an upward direction and a downward direction on DRAWINGS exist, can be provided.

The liquid crystal composition of the invention can be used in the optical device. The liquid crystal composition of the invention exhibits low drive voltage and a short response time, and therefore the optical device according to the preferred aspect of the invention can be driven at low voltage and allowed to provide a high speed response.

EXAMPLES

The invention will be described in more detail by way of Examples below, but the invention is not limited by the Examples. In addition, unless otherwise noted, "%" means "% by weight."

Moreover, a compound obtained was identified using a nuclear magnetic resonance spectrum obtained according to $^1$H-NMR analysis, a gas chromatogram obtained according to gas chromatography (GC) analysis, or the like. Analytical methods were as described below.

1) Analytical Method 1-1) $^1$H-NMR Analysis

As a measuring apparatus, DRX-500 (trade name, made by Bruker BioSpin Corporation) was used. A sample prepared in Example or the like was dissolved in a deuterated solvent such as $CDCl_3$ in which the sample was soluble, and measurement was carried out under conditions of room temperature, 500 MHz and 24 times of accumulation. In addition, in explanation of a nuclear magnetic resonance spectrum obtained, s, d, t, q and m stand for a singlet, a doublet, a triplet, a quartet and a multiplet, respectively. Moreover, tetramethylsilane (TMS) was used as a reference material for a zero point of chemical shifts (δ values).

1-2) GC Analysis

As a measuring apparatus, GC-14B Gas Chromatograph made by Shimadzu Corporation was used. As a column, capillary column CBP1-M25-025 (length 25 m, bore 0.22 mm, film thickness 0.25 μm); and dimethylpolysiloxane as a stationary liquid phase; non-polar) made by Shimadzu Corporation were used. Helium was used as a carrier gas, and a flow rate was adjusted at 1 mL/min. A temperature of a sample vaporizing chamber and a temperature of a detector (FID) part were set to 300° C. and 300° C., respectively.

The sample was dissolved in toluene and prepared to be a 1 weight % solution, and then 1 μL of the solution obtained was injected into the sample vaporizing chamber.

As a recorder, C-R6A Chromatopac made by Shimadzu Corporation or the equivalent thereof was used. In the gas chromatograms obtained, a retention time of a peak corresponding to each of component compounds and values of peak areas are shown.

In addition, as a solvent for diluting the sample, chloroform or hexane, for example, may be used. Moreover, as the column, capillary column DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd., or the like may be used.

A ratio of the peak areas in the gas chromatogram corresponds to a ratio of the component compounds. In general, weight percent of each of the component compounds in an analytical sample is not completely identical with a percentage of each of the peak areas in the analytical sample, but, when the column described above was used in the invention, the weight percent of each of the component compounds in the analytical sample substantially corresponds to the percentage of each of the peak areas in the analytical sample because a correction factor is essentially 1 (one). The reason is that no significant difference exists in the correction factors of the components in the liquid crystal compound. An internal standard method by the gas chromatograms is used in order to determine a composition ratio of the liquid crystal compounds in a liquid crystal composition more accurately by the gas chromatograms. Each liquid crystal compound component (test-component) weighed accurately in a fixed amount and a standard liquid crystal compound (standard reference material) are simultaneously measured according to gas chromatography, and the relative intensity of the ratio of the peak areas obtained between the test-component and the standard reference material is calculated in advance. When corrected based on the relative intensity of the peak area of each component relative to the standard reference material, the composition ratio of the liquid crystal compounds in the liquid crystal composition can be determined more accurately according to the gas chromatographic analysis.

1-3) Sample for Measuring Physical Properties of Liquid Crystal Compound or the Like A sample for measuring values of physical property of a liquid crystal compound includes two types of cases: a case where the compound itself is used as the sample, and a case where the compound is mixed with a base liquid crystal to be used as the sample.

In the latter case where the sample prepared by mixing the compound with the base liquid crystal is used, measurement is carried out according to the method described below. First, the sample is prepared by mixing 15% of the liquid crystal compound obtained and 85% of the base liquid crystal.

Then, according to an extrapolation method based on the calculation equation described below, extrapolated values are calculated from measured values of the sample obtained. The extrapolated values are taken as the values of physical property of the compound.

(Extrapolated value)=(100×(measured value of a sample)−(% of base liquid crystal)×(measured value of the base liquid crystal))/(% of a liquid crystal compound).

When a smectic phase or crystals precipitate at 25° C. even at the ratio of the liquid crystal compound to the base liquid crystal (15%:85%), a ratio of the liquid crystal compound to the base liquid crystal was changed in the order of (10%:90%), (5%:95%) and (1%:99%), the physical properties of the sample were measured at a composition in which no smectic phase or no crystals precipitated at 25° C., and the extrapolated values were determined according to the equation, and taken as the physical properties of the liquid crystal compound.

As the base liquid crystal used for measurements, a variety of kinds exist. For example, a composition of base liquid crystal A (%) is as described below.

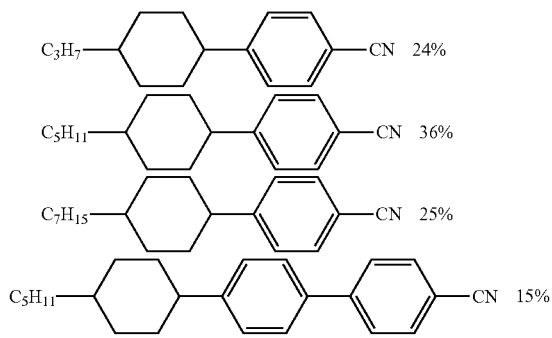

1-4) Methods for Measuring Values of Physical Properties of Liquid Crystal Compound or the Like Measurement of values of physical properties was performed according to the methods described below. Most of the measuring methods are described in EIAJ ED-2521A of the Standard of Electronic Industries Association of Japan, or modified thereon. Moreover, no TFT was attached to a TN device used for measurements.

Among measured values, in the case where the liquid crystal compound itself was used as the sample, the values obtained were described as experimental data. In the case where the mixture of the liquid crystal compound with the base liquid crystal was used as the sample, the values obtained according to the extrapolation method were described as experimental data.

1-4-1) Phase Structure and Phase Transition Temperature (° C.):

Measurement was carried out according to method (1) and method (2) described below.

(1) A compound was placed on a hot plate of a melting point apparatus (FP-52 Hot Stage made by Mettler Toledo International Inc.) equipped with a polarizing microscope, and a state of a phase and a change thereof were observed by the polarizing microscope while the compound was heated at a rate of 3° C./min, and a kind of a liquid crystal phase was specified.

(2) A sample was heated and then cooled at a rate of 3° C./min using a differential scanning calorimeter, DSC-7 System or Diamond DSC System, made by PerkinElmer, Inc. , and a starting point of an endothermic peak or an exothermic peak caused by a change of phase of the sample was determined by extrapolation (on set), and thus a phase transition temperature was determined.

Hereinafter, the crystals were expressed as K, and when the crystals were further distinguishable, each of the crystals was expressed as $K_1$ or $K_2$. Moreover, the smectic phase was expressed as Sm, a nematic phase as N and a chiral nematic phase as N*. Liquid (isotropic) was expressed as I. When smectic B phase or smectic A phase were distinguishable in the smectic phase, each of the phases was expressed as SmB or SmA, respectively. BP represents a blue phase or an optically isotropic liquid crystal phase. A state of coexistence of two phases may be occasionally represented in the forms of (N*+I) or (N*+BP). Specifically, (N*+I) represents a phase in which a non-liquid crystal isotropic phase and the chiral nematic phase coexist, and (N*+BP) represents a phase in which a BP phase or the optically isotropic liquid crystal phase and the chiral nematic phase coexist. Un represents an unidentified phase that is not optically isotropic. As an expression of the phase transition temperature, for example, "K 50.0 N 100.0 I" means 50.0° C. in a phase transition temperature from the crystals to the nematic phase (KN), and 100.0° C. in a phase transition temperature from the nematic phase to the liquid (NI). A same rule applies also to any other expression.

1-5) Maximum Temperature of Nematic Phase ($T_{NI}$; ° C.)

A sample (a mixture of the liquid crystal compound and the base liquid crystal) was placed on a hot plate of a melting point apparatus (FP52 Hot Stage made by Mettler Toledo International Inc.) equipped with a polarizing microscope, and was observed by the polarizing microscope while the sample was heated at a rate of 1° C./min. Temperature when part of the sample changed from a nematic phase to the isotropic liquid was taken as a maximum temperature of the nematic phase. Hereinafter, the maximum temperature of the nematic phase may be occasionally abbreviated simply as "maximum temperature."

1-6) Compatibility at Low Temperature:

Samples in which the base liquid crystal and the liquid crystal compound were mixed for the liquid crystal compound to be 20%, 15%, 10%, 5%, 3% and 1% were prepared, and placed in glass vials. After the glass vials were kept in freezers at −10° C. or −20° C. for a predetermined period of time, whether or not the crystals or the smectic phase precipitated was observed.

1-7) Viscosity (Bulk Viscosity; η; Measured at 20° C.; mPa·s)

The mixture of the liquid crystal compound and the base liquid crystal was measured by using a cone-plate (E type) viscometer.

1-8) Refractive Index Anisotropy (Δn)

Measurement was carried out by an Abbe refractometer with a polarizing plate mounted on an ocular by using light at a wavelength of 589 nm at a temperature of 25° C. A surface of a main prism was rubbed in one direction, and then a sample (a mixture of the liquid crystal compound and the base liquid crystal) was added dropwise onto the main prism. A refractive index (n∥) was measured when a direction of polarized light was parallel to a direction of rubbing. A refractive index (n⊥) was measured when the direction of polarized light was perpendicular to the direction of rubbing. Values of refractive index anisotropy (Δn) were calculated from an equation: Δn=n∥−n⊥.

1-9) Dielectric Anisotropy (Δε; measured at 25° C.)

A sample (a mixture of the liquid crystal compound and the base liquid crystal) was put in a liquid crystal cell in which a distance (gap) between two glass substrates was about 9 µm and a twist angle was 80 degrees. A voltage of 20 V was applied to the cell, and a dielectric constant (ε∥) in the major axis direction of liquid crystal molecules was measured. A voltage of 0.5 V was applied to the cell, and a dielectric constant (ε⊥) in the minor axis direction of the liquid crystal molecules was measured. A value of dielectric anisotropy was calculated from an equation: Δε=ε∥−ε⊥.

1-10) Pitch (P; Measured at 25° C.; nm)

Pitch length was measured using selective reflection (Handbook of Liquid Crystals (Ekisho Binran in Japanese), page 196, issued in 2000, Maruzen Co., Ltd.). A relational formula: <n>p/λ=1 holds for selective reflection wavelength λ. Here, <n> represents an average refractive index and is given by the following formula: $<n>=\{(n\|^2+n\perp^2)/2\}^{1/2}$. The selective reflection wavelength was measured by a microspectrophotometer (JEOL Ltd., trade name MSV-350). The pitch was determined by dividing obtained reflection wavelength by the average refractive index. Because the pitch of a cholesteric liquid crystal having a reflection wavelength in a region of wavelength longer than the wavelength of visible light is proportional to a reciprocal of a concentration of an optically active compound in a region in which the concentration of the optically active compound is low, the pitch was determined by measuring several pitch lengths of a liquid crystal having a selective reflection wavelength in a visible light region, and applying a linear extrapolation method. "Optically active compound" corresponds to a chiral agent of the invention.

In the invention, values of characteristic of the liquid crystal composition can be measured according to the method described below. Most of the methods are applied as described in EIAJ ED-2521A of the Standard of Electronic Industries Association of Japan, or as modified thereon. No TFT was attached to a TN device used for measurement.

1-11) Maximum Temperature of Nematic Phase (NI; ° C.):

A sample was placed on a hot plate in a melting point apparatus equipped with a polarizing microscope, and heated at a rate of 1° C./min. Temperature when part of the sample began to change from a nematic phase to isotropic liquid was measured. A maximum temperature of the nematic phase may be occasionally abbreviated as "maximum temperature."

1-12) Minimum Temperature of Nematic Phase ($T_C$; ° C.)

Samples each having a nematic phase were kept in freezers at temperatures of 0° C., −10° C., −20° C., −30° C. and −40° C. for 10 days, and then liquid crystal phases were observed. For example, when the sample maintained the nematic phase at −20° C. and changed to crystals (or a smectic phase) at −30° C., $T_c$ was expressed as $T_C \leq -20°$ C. "Minimum temperature of the nematic phase" may be occasionally abbreviated as "minimum temperature."

1-13) Transition Temperature of Optically Isotropic Liquid Crystal Phase

A sample was put on a hot plate in a melting point apparatus equipped with a polarizing microscope, and in a crossed nicol state, the sample was first heated to a temperature at which the sample was changed to a non-liquid crystal isotropic phase, and then cooled at a rate of 1° C./min to allow a chiral nematic phase or an optically isotropic liquid crystal phase to completely appear. Temperature at which phase transition was caused in a temperature-decreasing process was measured, subsequently the temperature was increased at a rate of 1° C./min, and temperature at which the phase transition was caused in a temperature-increasing process was measured. In the invention, unless otherwise noted, the temperature at which the phase transition was caused in the temperature-increasing process was taken as a phase transition temperature. When discrimination of the phase transition temperature was difficult in a dark field under crossed nicols in the optically isotropic liquid crystal phase, the phase transition temperature was measured by shifting the polarizing plate by 1 to 10° from the crossed nicol state.

1-14) Viscosity (Rotational Viscosity; γ1; measured at 25° C.; mPa·s)

(1) Sample having positive dielectric anisotropy: Measurement was carried out according to a method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 µm. Voltage was applied stepwise to the TN device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and a calculation equation (8) on page 40 of the paper presented by M. Imai et al. A value of dielectric anisotropy required for the calculation was determined by the method of measuring the dielectric anisotropy as described below in the device used in measurement of the rotational viscosity.

(2) Sample having negative dielectric anisotropy: Measurement was carried out according to the method described in M. Imai et al., Molecular Crystals and Liquid Crystals, Vol. 259, p. 37 (1995). A sample was put in a VA device in which a distance (cell gap) between two glass substrates was 20 µm. Voltage was applied stepwise to the device in the range of 30 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. In dielectric anisotropy required for the calculation, a value measured in the dielectric anisotropy described below was used.

1-15) Refractive Index Anisotropy (Δn; Measured at 25° C.):

Measurement was carried out by an Abbe refractometer with a polarizing plate mounted on an ocular, using light at a wavelength of 589 nm. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of refractive index anisotropy was calculated from an equation: Δn=n∥−n⊥. When a sample was a composition, the refractive index anisotropy was measured by the method described above.

1-16) Dielectric Anisotropy (Δε; Measured at 25° C.):

(1) Composition having positive dielectric anisotropy: A sample was put in a liquid crystal cell in which a distance (gap) between two glass substrates was about 9 µm and a twist angle was 80 degrees. A voltage of 20 V was applied to the cell, and a dielectric constant (ε∥) in the major axis direction of liquid crystal molecules was measured. A voltage of 0.5 V was applied to the cell, and a dielectric constant (ε⊥) in the minor axis direction of the liquid crystal molecules was measured. A value of dielectric anisotropy was calculated from an equation: Δε=ε∥−ε⊥.

(2) Composition having negative dielectric anisotropy: A sample was put in a liquid crystal cell processed into homeotropic alignment, and a dielectric constant (ε∥) was measured by applying a voltage of 0.5 V. The sample was put in a liquid crystal cell processed into homogeneous alignment, and a dielectric constant (ε⊥) was measured by applying a voltage of 0.5 V. A value of dielectric anisotropy was calculated from an equation: Δε=ε∥−ε⊥.

1-17) Threshold Voltage (Vth; Measured at 25° C.; V)

1) Composition having positive dielectric anisotropy: A sample was put in a normally white mode liquid crystal display device in which a distance (gap) between two glass substrates was (0.5/Δn) μm and a twist angle was 80 degrees. Here, Δn represents a value of refractive index anisotropy measured by the method described above. Rectangular waves having a frequency of 32 Hz were applied to the device. A voltage of the rectangular wave was increased and a value of voltage when the transmittance of the light transmitted through the device became 90% was measured.

2) Composition having negative dielectric anisotropy: A sample was put in a normally black mode liquid crystal display device in which a distance (gap) between two glass substrates was about 9 μm, and which was processed into homeotropic alignment. Rectangular waves having a frequency of 32 Hz were applied to the device. A voltage of the rectangular wave was increased and a value of voltage when the transmittance of the light transmitted through the device became 10% was measured.

1-18) Voltage Holding Ratio (VHR; Measured at 25° C.; %)

A TN device used for measurement had a polyimide-alignment film, and a distance (cell gap) between two glass substrates was 6 μm. A sample was put in the device, and then the device was sealed with an ultraviolet-polymerizable adhesive. A pulse voltage (60 microseconds at 5 V) was applied to the TN device, and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

1-19) Helical Pitch (Measured at 20° C.; μm)

A Cano wedge cell method was applied to measurement of a helical pitch. The sample was injected into a Cano wedge cell, and a distance (a; unit pm) between disclination lines observed from a cell was measured. Helical pitch (P) was calculated from a formula: P=2·a·tan θ. Here, θ is an angle between two glass plates in the wedge cell.

Alternatively, pitch length was measured using selective reflection (Handbook of Liquid Crystals (Ekisho Binran in Japanese), page 196, issued in 2000, Maruzen Co., Ltd.). A relational formula: <n>p/λ=1 holds for selective reflection wavelength λ. Here, <n> represents an average refractive index and is given by the following formula: $<n>=\{(n\|^2+n\bot^2)/2\}^{1/2}$. The selective reflection wavelength was measured by a microspectrophotometer (JEOL Ltd., trade name MSV-350). The pitch was determined by dividing obtained reflection wavelength by the average refractive index.

Because the pitch of the cholesteric liquid crystal having the reflection wavelength in the region of the wavelength longer than the wavelength of visible light is proportional to the reciprocal of the concentration of the chiral agent in the region in which the concentration of the chiral agent is low, the pitch was obtained by measuring several pitch lengths of the liquid crystal having the selective reflection wavelength in the visible light region, and applying the linear extrapolation method.

A proportion (percentage) of the component or the liquid crystal compound is expressed in terms of weight percent (% by weight) based on the total weight of the liquid crystal compound. A composition is prepared by measuring the weight of components such as liquid crystal compounds and then mixing the components. Accordingly, the weight percent of the component is easily calculated.

1-20) Saturation Voltage (Measured at 25° C.; V)

Figure 2:
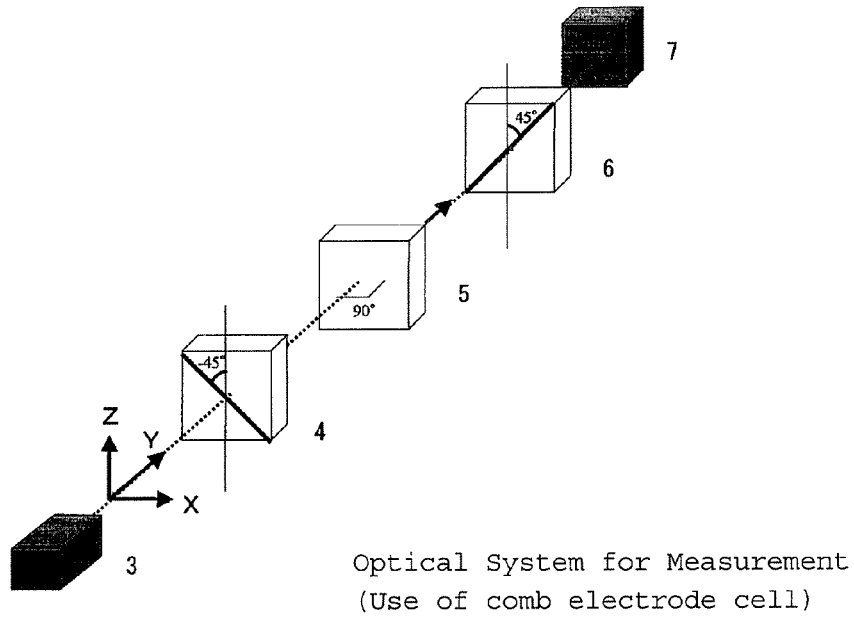
FIG. 2 shows an optical system used in Examples.

The cells in which the polymer-liquid crystal composite materials were interposed therebetween were set in an optical system shown in FIG. 2. Specifically, a white light source 3 for a polarizing microscope (ECLIPSE LV100POL, made by NIKON Corporation) was used as a light source to adjust an angle incident to the cell (comb-shaped electrode cell 5) to be perpendicular to a cell face, and the cell was set for polarizing plates of Polarizer 4 and Analyzer 6 to be in a crossed nicol state. The cell was set for a line direction of the comb-shaped electrode of the cells in which the polymer-liquid crystal composite materials were interposed therebetween as shown in FIG. 1 to be an angle of 45 degrees to each of the polarizing plates, and intensity of light transmitted through the polarizing plates and the cell was measured by using an optical power meter (3298F made by YOKOGAWA Corporation) (Photodetector 7). Voltage at a rectangular wave was applied to the cells in which the polymer-liquid crystal composite materials were interposed therebetween, and applied voltage at maximum transmitted light intensity was taken as saturation voltage.

1-21) Contrast Ratio (Measured at Room Temperature)

The cells in which the polymer-liquid crystal composite materials were interposed therebetween were set in an optical system shown in FIG. 2. Specifically, a white light source 3 for a polarizing microscope (ECLIPSE LV100POL, made by NIKON Corporation) was used as a light source to adjust an angle incident to the cell (comb-shaped electrode cell 5) to be perpendicular to a cell face, and the cell was set for polarizing plates of Polarizer 4 and Analyzer 6 to be in a crossed nicol state. The cell was set for a line direction of the comb-shaped electrode of the cells in which the polymer-liquid crystal composite materials were interposed therebetween as shown in FIG. 1 to be an angle of 45 degrees to each of the polarizing plates, and intensity of light transmitted through the polarizing plates and the cell was measured by using an optical power meter (3298F made by YOKOGAWA Corporation) (Photodetector 7). Voltage at a rectangular wave was applied to the cells in which the polymer-liquid crystal composite materials were interposed therebetween, and a value obtained by dividing a value at maximum transmitted light intensity by a value at transmitted light intensity when voltage application was stopped was taken as a contrast ratio.

1-22) Response Time (Measured at 25° C.; V)

The cells in which the polymer-liquid crystal composite materials were interposed therebetween were set in an optical system shown in FIG. 2. Specifically, a white light source 3 for a polarizing microscope (ECLIPSE LV100POL, made by NIKON Corporation) was used as a light source to adjust an angle incident to the cell (comb-shaped electrode cell 5) to be perpendicular to a cell face, and the cell was set for polarizing plates of Polarizer 4 and Analyzer 6 to be in a crossed nicol state. The cell was set for a line direction of the comb-shaped electrode of the cells in which the polymer-liquid crystal composite materials were interposed therebetween as shown in FIG. 1 to be an angle of 45 degrees to each of the polarizing plates, and intensity of light transmitted through the polarizing plates and the cell was measured by using an optical power meter (H5784 made by HAMAMATSU Corporation) (Photodetector 7). Voltage at a pulse wave was applied to the cells in which the polymer-liquid crystal composite materials were interposed therebetween and then time for transmitted light intensity to change from 10% to 90% of a maximum value thereof was taken as "a response time during voltage application," and the voltage application was stopped and then time for transmitted light intensity to change from 90% to 10% of the maximum value thereof was taken as "a response time during no voltage application."

1-23) Peak Top Measurement of a Dielectric Loss Factor Curve

A liquid crystal display device was obtained by preparing a polymer-stabilized blue phase (PSBP) in a cell in which a distance (d; gap) between two glass substrates was about 10 µm and an electrode area (S) equipped with an ITO electrode was about 0.16 cm². A voltage of 10 V was applied to the device, and capacitance (C) and a dielectric loss tangent (tangent δ) in a frequency of 20 to 2 MHz were measured by using an LCR meter (E4980A made by Agilent Corporation). The measured capacitance (C) was substituted into the following equation: $\varepsilon'=(C\times d)/(\varepsilon_0 \times S)$ to derive dielectric constant $\varepsilon'$, and dielectric loss factor $\varepsilon''$ was derived from the following equation: $\varepsilon''=\varepsilon' \times \tan \delta$. Here, $\varepsilon_0$ is a dielectric constant of vacuum, and a value of $\varepsilon_0$ is 8.854 (pF/m). In a graph in which thus obtained dielectric loss factor $\varepsilon''$ is set in a vertical axis and a frequency is set in a horizontal axis, a peak may be occasionally confirmed when dielectric relaxation exists in the range of the measured frequency. A frequency dependence of dielectric loss factor $\varepsilon''$ correlates with a frequency dependence of dielectric constant $\varepsilon'$, and therefore an index of decrease in an effective dielectric constant in a high frequency wave is set by measuring a peak top of a dielectric loss factor curve. For secure the effective dielectric constant, the peak top of the dielectric loss factor curve is preferably in a high frequency, further preferably in a frequency higher than 10 kHz, and still further preferably in a frequency higher than 20 kHz. In addition, the peak top of the dielectric loss factor curve was measured at temperature 50° C. lower than temperature at which phase transition from a BP phase to a liquid phase was caused in the polymer-liquid crystal composite material.

The compounds in Examples were represented by using symbols according to definitions in Table 3 described below. In Table 3, the configuration of 1,4-cyclohexylene is trans. A parenthesized number next to a symbolized compound corresponds to the number of the compound. A symbol (-) means any other liquid crystal compound. A proportion (percentage) of the liquid crystal compound is expressed in terms of weight percent (% by weight) based on the weight of the liquid crystal composition. Values of characteristics of the composition were summarized in a last part.

TABLE 3

Method for Description of Compounds using Symbols

R—(A1)—Z1— ... —Zn—(An)—R'

| 1) Left-terminal Group R— | Symbol |
|---|---|
| $C_nH_{2n+1}$— | n— |
| $C_nH_{2n+1}O$— | nO— |
| $C_mH_{2m+1}OC_nH_{2n}$— | mOn— |
| $CH_2$=CH— | V— |

TABLE 3-continued

Method for Description of Compounds using Symbols

R—(A1)—Z1— ... —Zn—(An)—R'

| | |
|---|---|
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| H— | H— |

| 2) Right-terminal Group —R' | Symbol |
|---|---|
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —$C_nH_{2n}$—CH=CH—$C_mH_{2m+1}$ | —nVm |
| —CH=$CF_2$ | —VFF |
| —$COOCH_3$ | —EMe |
| —F | —F |
| —Cl | —CL |
| —$OCF_3$ | —OCF3 |
| —$CF_3$ | —CF3 |
| —CN | —C |

| 3) Bonding Group —$Z_n$— | Symbol |
|---|---|
| —$C_2H_4$— | 2 |
| —O— | O |
| —CH=CH— | V |
| —C≡C— | T |
| —$CF_2O$— | X |
| —$CH_2O$— | 1O |

| 4) Ring Structure —$A_n$— | Symbol |
|---|---|
|  | H |
| 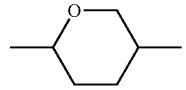 | Dh |
| 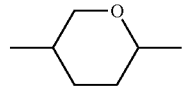 | dh |
|  | B |
| 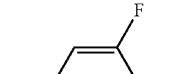 | B(F) |
| 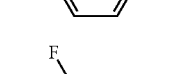 | B(2F) |
| 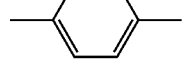 | B(F,F) |

TABLE 3-continued

Method for Description of Compounds using Symbols

R—(A1)—Z1— . . . —Zn—(An)—R'

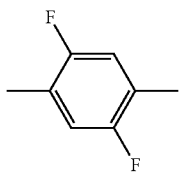   B(2F,5F)

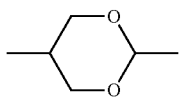   G

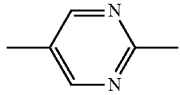   Py

5) Examples of Description
Example 1  5-HBB(F)B-2

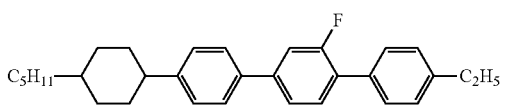

Example 2  3-BB(F)B(F,F)—F

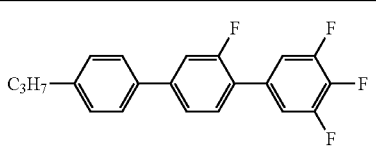

Example 3  4-B(F)B(F,F)B(F,F)XB(F,F)—F

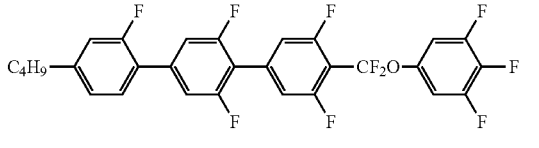

Example 4  2-GB(F,F)XB(F)B(F,F)—F

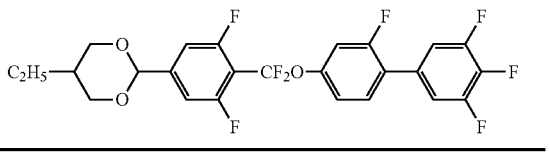

Example 1

Nematic liquid crystal composition NLC-A was prepared.

| 5-HBB(F)B-2 | (1-1) | 10% |
| --- | --- | --- |
| 4-B(F)B(F,F)B(F,F)XB(F,F)-F | (2-1) | 6.3% |
| 5-B(F)B(F,F)B(F,F)XB(F,F)-F | (2-1) | 6.3% |

-continued

| 6-B(F)B(F,F)B(F,F)XB(F,F)-F | (2-1) | 6.3% |
| --- | --- | --- |
| 3-B(F)B(F,F)B(F,F)XB(F,F)-CF3 | (2-2) | 2.7% |
| 4-B(F)B(F,F)B(F,F)XB(F,F)-CF3 | (2-2) | 2.7% |
| 3-GB(F)B(F,F)XB(F,F)-F | (3-1) | 11.7% |
| 4-GB(F)B(F,F)XB(F,F)-F | (3-1) | 10.8% |
| 5-GB(F)B(F,F)XB(F,F)-F | (3-1) | 10.8% |
| 2-GB(F,F)XB(F)B(F,F)-F | (3-2) | 16.2% |
| 3-GB(F,F)XB(F)B(F,F)-F | (3-2) | 16.2% |

A phase transition temperature of NLC-A: N 112.8 to 117.0 Iso.

Next, nematic liquid crystal composition NLC-A was mixed with chiral agent CD1 described below, and chiral liquid crystal composition CLC-A was prepared.

| NLC-A | 95.0% |
| --- | --- |
| CD1 | 5.0% |

A phase transition temperature of CLC-A: N* 103.4 to 104.7 BP–BP+Iso.–Iso.

Structure Formula of CD1

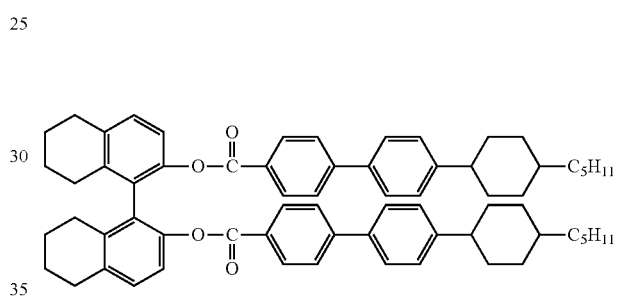

Liquid crystal composition MLC-A was prepared by heating and mixing a mixture of chiral liquid crystal composition CLC-A prepared and a polymerizable monomer in an isotropic phase.

| CLC-A | 87.9% |
| --- | --- |
| n-hexadecyl acrylate | 6.5% |
| LCA-12 | 5.2% |
| DMPA | 0.4% |

A phase transition temperature of MLC-A: N* 69.6 to 69.9 BP–BP+Iso.–Iso.

LCA-12 and DMPA described above represent 1,4-di(4-(6-(acryloyloxy))-2-methylbenzene and 2,2'-dimethoxyphenylacetophenone, respectively, and DMPA is a photopolymerization initiator.

Structure Formula of LCA-12

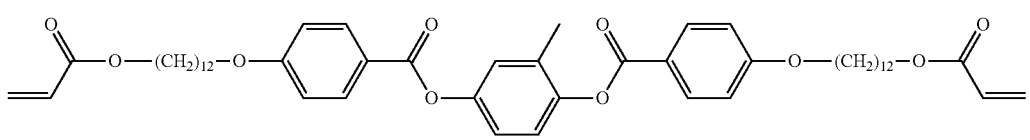

Liquid crystal composition MLC-A was interposed between a comb-like electrode substrate and a facing glass substrate (provided with no electrode) in which each substrate was subjected to no alignment treatment, and the assembly was heated to a blue phase (polymerization temperature: 69.8° C.). In the above state, the assembly was irradiated with ultraviolet light (ultraviolet light intensity 23 nWcm$^{-2}$ (365 nm)) for 1 minute, and a polymerization reaction was performed to prepare a cell in which polymer-liquid crystal composite material PSBP-A was interposed therebetween (cell thickness: 7.57 μm).

Physical property values of PSBP-A were as described below.

Phase transition temperature: BP 99.0 BP+Iso.–Iso.

Saturation voltage: 50.3V, a contrast ratio: 450.

A peak top of a dielectric loss factor curve was 50 kHz, and an effective dielectric constant in a high frequency range was found to be securable.

Comparative Example 1

Nematic liquid crystal composition NLC-Z was prepared.

| | | |
|---|---|---|
| 4-B(F)B(F,F)B(F,F)XB(F,F)-F | (2-1) | 7% |
| 5-B(F)B(F,F)B(F,F)XB(F,F)-F | (2-1) | 7% |
| 6-B(F)B(F,F)B(F,F)XB(F,F)-F | (2-1) | 7% |
| 3-B(F)B(F,F)B(F,F)XB(F,F)-CF3 | (2-2) | 3% |
| 4-B(F)B(F,F)B(F,F)XB(F,F)-CF3 | (2-2) | 3% |
| 3-GB(F)B(F,F)XB(F,F)-F | (3-1) | 13% |
| 4-GB(F)B(F,F)XB(F,F)-F | (3-1) | 12% |
| 5-GB(F)B(F,F)XB(F,F)-F | (3-1) | 12% |
| 2-GB(F,F)XB(F)B(F,F)-F | (3-2) | 18% |
| 3-GB(F,F)XB(F)B(F,F)-F | (3-2) | 18% |

A phase transition point of NLC-Z: N 88.6 to 89.0 Iso.

Nematic liquid crystal composition NLC-Z was mixed with chiral agent CD1 described below, and chiral liquid crystal composition CLC-Z was prepared.

| | |
|---|---|
| NLC-A | 95.2% |
| CD1 | 4.8% |

In a manner similar to a method in Example 1, liquid crystal composition MLC-Z and polymer-liquid crystal composite material PSBP-Z were obtained.

| | |
|---|---|
| Phase transition temperature of CLC-Z | N* 79.6 to 79.9 BP-BP + Iso.-Iso. Iso.-BP + Iso.-BP 78.2 to 77.7 N* |
| Phase transition temperature of MLC-Z | N* 50.3 to 50.8 BP 53.2 BP + Iso.-Iso. Iso. 50.9 BP 48.4 to 47.0 N* |

Physical property values of PSBP-Z were as described below.

A phase transition temperature of PSBP-Z: BP 76.0 BP+Iso.–Iso.

Polymerization temperature: 50.7° C., cell thickness: 7.60 μm, saturation voltage: 40.3 V, a contrast ratio: 740 and a peak top of a dielectric loss factor curve: 1 kHz.

The peak top of the dielectric loss factor curve of PSBP-Z containing no compound of formula (1) in the nematic liquid crystal composition exists on a lower voltage side in comparison with a peak top of a dielectric loss factor curve of PSBP-A containing the compound of formula (1), and an effective dielectric constant is small in a high frequency range.

Example 2

Nematic liquid crystal composition NLC-B was prepared.

| | | |
|---|---|---|
| 5-HBB(F)B-2 | (1-1) | 10% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 4-B(F)B(F,CL)B(F,F)XB(F,F)-CF3 | (2-3) | 8% |
| 5-B(F)B(F,CL)B(F,F)XB(F,F)-CF3 | (2-3) | 8% |
| 6-B(F)B(F,CL)B(F,F)XB(F,F)-CF3 | (2-3) | 8% |
| 3-GB(F)B(F,F)XB(F,F)-F | (3-1) | 4% |
| 4-GB(F)B(F,F)XB(F,F)-F | (3-1) | 4% |
| 5-GB(F)B(F,F)XB(F,F)-F | (3-1) | 4% |
| 2-GB(F,F)XB(F)B(F,F)-F | (3-2) | 18% |
| 3-GB(F,F)XB(F)B(F,F)-F | (3-2) | 18% |
| 4-GB(F,F)XB(F)B(F,F)-F | (3-2) | 7% |
| 5-GB(F,F)XB(F)B(F,F)-F | (3-2) | 5% |

A phase transition temperature of NLC-B: N 88.9 to 97.3 Iso.

In a manner similar to a method in Example 1, chiral liquid crystal composition CLC-B, liquid crystal composition MLC-B and polymer-liquid crystal composite material PSBP-B were obtained.

| | |
|---|---|
| Phase transition temperature of CLC-B | N* 79.6 to 77.9 BP-BP + Iso.-Iso. Iso.-BP + Iso.-BP 77.4 to 76.2 N* |
| Phase transition temperature of MLC-B | N* 49.0 to 49.9 BP-BP + Iso. 59.3 Iso. Iso. 57.9 BP + Iso.-BP 47.0 to 44.7 N* |

Physical property values of PSBP-B were as described below.

A phase transition temperature of PSBP-Z: BP 74.0 BP+Iso.–Iso.

Polymerization temperature: 49.2° C., cell thickness: 7.42 μm, saturation voltage: 69.6 V, a contrast ratio: 770 and a peak top of a dielectric loss factor curve: 5 kHz.

Example 3

Nematic liquid crystal composition NLC-C was prepared.

| | | |
|---|---|---|
| 5-HBB(F)B-2 | (1-1) | 8% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 4% |
| 4-GB(F)B(F,F)XB(F,F)-F | (3-1) | 4% |
| 5-GB(F)B(F,F)XB(F,F)-F | (3-1) | 4% |
| 1-GB(F,F)XB(F)B(F,F)-F | (3-2) | 5% |
| 2-GB(F,F)XB(F)B(F,F)-F | (3-2) | 18% |
| 3-GB(F,F)XB(F)B(F,F)-F | (3-2) | 18% |
| 4-GB(F,F)XB(F)B(F,F)-F | (3-2) | 13% |
| 3-BB(F)B(F,F)-F | (4-20) | 10% |

A phase transition temperature of NLC-C: N 88.9 to 92.3 Iso.

In a manner similar to a method in Example 1, chiral liquid crystal composition CLC-C, liquid crystal composition MLC-C and polymer-liquid crystal composite material PSBP-C were obtained.

| Phase transition temperature of CLC-C | N* 79.4 to 79.8 BP-BP + Iso.-Iso. Iso.-BP + Iso.-BP 78.1 to 77.7 N* |
| Phase transition temperature of MLC-C | N* 52.1 to 52.6 BP-BP + Iso. 59.0 Iso. Iso.57.6 BP + Iso.-BP 50.3 to 49.3 N* |

Physical property values of PSBP-C were as described below.

A phase transition temperature of PSBP-C: BP 77.0 BP+Iso.–Iso.

Polymerization temperature: 52.3° C., cell thickness: 7.45 μm, saturation voltage: 65.6 V, a contrast ratio: 750 and a peak top of a dielectric loss factor curve: 7 kHz.

Example 4

Nematic liquid crystal composition NLC-D was prepared.

| 5-HBB(F)B-2 | (1-1) | 9.5% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 3% |
| 4-GB(F)B(F,F)XB(F,F)-F | (3-1) | 3% |
| 5-GB(F)B(F,F)XB(F,F)-F | (3-1) | 3% |
| 2-GB(F,F)XB(F)B(F,F)-F | (3-2) | 19% |
| 3-GB(F,F)XB(F)B(F,F)-F | (3-2) | 19% |
| 4-GB(F,F)XB(F)B(F,F)-F | (3-2) | 12.5% |
| 3-BB(F)B(F,F)-F | (4-20) | 15% |

A phase transition temperature of NLC-D: N 91.8 to 95.0 Iso.

In a manner similar to a method in Example 1, chiral liquid crystal composition CLC-D, liquid crystal composition MLC-D and polymer-liquid crystal composite material PSBP-D were obtained.

| Phase transition temperature of CLC-D | N* 82.6 to 83.0 BP-BP + Iso.-Iso. Iso.-BP + Iso.-BP 81.8 to 81.4 N* |
| Phase transition temperature of MLC-D | N* 54.9 to 55.4 BP-BP + Iso.-Iso. Iso.-BP + Iso.-BP 53.4 to 52.4 N* |

Physical property values of PSBP-D were as described below.

A phase transition temperature of PSBP-D: BP 81.0 BP+Iso.–Iso.

Polymerization temperature: 55.2° C., cell thickness: 7.90 μm, saturation voltage: 71.2 V, a contrast ratio: 480 and a peak top of a dielectric loss factor curve: 10 kHz.

Example 5

Nematic liquid crystal composition NLC-E was prepared.

| 5-HBB(F)B-2 | (1-1) | 10% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 4% |
| 4-GB(F)B(F,F)XB(F,F)-F | (3-1) | 4% |
| 5-GB(F)B(F,F)XB(F,F)-F | (3-1) | 4% |
| 1-GB(F,F)XB(F)B(F,F)-F | (3-2) | 5% |
| 2-GB(F,F)XB(F)B(F,F)-F | (3-2) | 18% |
| 3-GB(F,F)XB(F)B(F,F)-F | (3-2) | 18% |
| 4-GB(F,F)XB(F)B(F,F)-F | (3-2) | 14% |
| 1-BB-5 | (4-3) | 7% |

A phase transition temperature of NLC-E: N 88.6 to 94.3 Iso.

In a manner similar to a method in Example 1, chiral liquid crystal composition CLC-E, liquid crystal composition MLC-E and polymer-liquid crystal composite material PSBP-E were obtained.

| Phase transition temperature of CLC-E | N* 80.4 to 80.7 BP-BP + Iso. 84.1 Iso. Iso. 83.7 BP + Iso.-BP 78.8 to 78.0 N* |
| Phase transition temperature of MLC-E | N* 54.0 to 54.4 BP-BP + Iso.-Iso. Iso. 61.0 BP + Iso.-BP 51.6 to 50.8 N* |

Physical property values of PSBP-E were as described below.

A phase transition temperature of PSBP-E: BP 77.0 BP+Iso.–Iso.

Polymerization temperature: 54.2° C., cell thickness: 7.38 μm, saturation voltage: 82.2 V, a contrast ratio: 930 and a peak top of a dielectric loss factor curve: 10 kHz.

Example 6

Nematic liquid crystal composition NLC-F was prepared.

| 5-HBB(F)B-2 | (1-1) | 10% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 4% |
| 4-GB(F)B(F,F)XB(F,F)-F | (3-1) | 4% |
| 5-GB(F)B(F,F)XB(F,F)-F | (3-1) | 4% |
| 1-GB(F,F)XB(F)B(F,F)-F | (3-2) | 5% |
| 2-GB(F,F)XB(F)B(F,F)-F | (3-2) | 18% |
| 3-GB(F,F)XB(F)B(F,F)-F | (3-2) | 18% |
| 4-GB(F,F)XB(F)B(F,F)-F | (3-2) | 14% |
| 5-HXB(F,F)-F | (4-21) | 7% |

A phase transition temperature of NLC-F: N 87.8 to 95.7 Iso.

In a manner similar to a method in Example 1, chiral liquid crystal composition CLC-F, liquid crystal composition MLC-F and polymer-liquid crystal composite material PSBP-F were obtained.

| Phase transition temperature of CLC-F | N* 80.3 to 80.6 BP-BP + Iso.-Iso. Iso. 82.1 BP + Iso.-BP 79.3 to 78.9 N* |
| Phase transition temperature of MLC-F | N* 52.9 to 53.3 BP 53.5 BP + Iso. 61.8 Iso. Iso. 54.7 BP 50.4 to 49.5 N* |

Physical property values of PSBP-F were as described below.

A phase transition temperature of PSBP-F: BP 76.0 BP+Iso.–Iso.

Polymerization temperature: 53.1° C., cell thickness: 7.56 μm, saturation voltage: 74.5 V, a contrast ratio: 690 and a peak top of a dielectric loss factor curve: 10 kHz.

Example 7

Nematic liquid crystal composition NLC-G was prepared.

| | | |
|---|---|---|
| 5-HBB(F)B-2 | (1-1) | 8% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 4% |
| 4-GB(F)B(F,F)XB(F,F)-F | (3-1) | 4% |
| 5-GB(F)B(F,F)XB(F,F)-F | (3-1) | 4% |
| 1-GB(F,F)XB(F)B(F,F)-F | (3-2) | 6% |
| 2-GB(F,F)XB(F)B(F,F)-F | (3-2) | 18% |
| 3-GB(F,F)XB(F)B(F,F)-F | (3-2) | 18% |
| 4-GB(F,F)XB(F)B(F,F)-F | (3-2) | 12% |
| 2-HH-3 | (4-1) | 5% |
| 3-BB(F)B(F,F)-F | (4-20) | 5% |

A phase transition temperature of NLC-G: N 88.6 to 91.8 Iso.

In a manner similar to a method in Example 1, chiral liquid crystal composition CLC-G, liquid crystal composition MLC-G and polymer-liquid crystal composite material PSBP-G were obtained.

| | |
|---|---|
| Phase transition temperature of CLC-G | N* 80.8 to 81.0 BP-BP + Iso.-Iso. Iso. 83.8 BP + Iso.-BP 79.3 to 78.6 N* |
| Phase transition temperature of MLC-G | N* 54.6 to 56.6 BP-BP + Iso. 60.0 Iso. Iso. 59.7 BP + Iso.-BP 52.7 to 52.0 N* |

Physical property values of PSBP-G were as described below.

A phase transition temperature of PSBP-G: BP 77.0 BP+Iso.–Iso.

Polymerization temperature: 54.8° C., cell thickness: 7.19 μm, saturation voltage: 70.2 V, a contrast ratio: 930 and a peak top of a dielectric loss factor curve: 10 kHz.

Example 8

Nematic liquid crystal composition NLC-H was prepared.

| | | |
|---|---|---|
| 5-HBB(F)B-2 | (1-1) | 14% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 4% |
| 4-GB(F)B(F,F)XB(F,F)-F | (3-1) | 4% |
| 5-GB(F)B(F,F)XB(F,F)-F | (3-1) | 4% |
| 1-GB(F,F)XB(F)B(F,F)-F | (3-2) | 5% |
| 2-GB(F,F)XB(F)B(F,F)-F | (3-2) | 18% |
| 3-GB(F,F)XB(F)B(F,F)-F | (3-2) | 18% |
| 4-GB(F,F)XB(F)B(F,F)-F | (3-2) | 12% |
| H-BOB-F | (4-4) | 5% |

A phase transition temperature of NLC-H: N 84.2 to 87.5 Iso.

In a manner similar to a method in Example 1, chiral liquid crystal composition CLC-H, liquid crystal composition MLC-H and polymer-liquid crystal composite material PSBP-H were obtained.

| | |
|---|---|
| Phase transition temperature of CLC-H | N* 77.8 to 79.1 BP-BP + Iso. 88.3 Iso. Iso. 84.1 BP + Iso.-BP 76.7 to 75.4 N* |
| Phase transition temperature of MLC-H | N* 48.8 to 49.4 BP-BP + Iso.-Iso. Iso. 51.7 BP + Iso.-BP 46.0 to 45.0 N* |

Physical property values of PSBP-H were as described below.

A phase transition temperature of PSBP-H: BP 75.0 BP+Iso.–Iso.

Polymerization temperature: 49.0° C., cell thickness: 7.19 μm, saturation voltage: 80.0 V, a contrast ratio: 810 and a peak top of a dielectric loss factor curve: 15 kHz.

Example 9

Nematic liquid crystal composition NLC-I was prepared.

| | | |
|---|---|---|
| 5-HBB(F)B-2 | (1-1) | 17% |
| 4-B(F)B(F,F)B(F,F)XB(F,F)-F | (2-1) | 2% |
| 5-B(F)B(F,F)B(F,F)XB(F,F)-F | (2-1) | 2% |
| 6-B(F)B(F,F)B(F,F)XB(F,F)-F | (2-1) | 2% |
| 3-B(F)B(F,F)B(F,F)XB(F,F)-CF3 | (2-2) | 2.5% |
| 4-B(F)B(F,F)B(F,F)XB(F,F)-CF3 | (2-2) | 2.5% |
| 5-B(F)B(F,F)B(F,F)XB(F,F)-CF3 | (2-2) | 2.5% |
| 6-B(F)B(F,F)B(F,F)XB(F,F)-CF3 | (2-2) | 2.5% |
| 3-GB(F)B(F,F)XB(F,F)-F | (3-1) | 3% |
| 4-GB(F)B(F,F)XB(F,F)-F | (3-1) | 3% |
| 5-GB(F)B(F,F)XB(F,F)-F | (3-1) | 3% |
| 1-GB(F,F)XB(F)B(F,F)-F | (3-2) | 8% |
| 2-GB(F,F)XB(F)B(F,F)-F | (3-2) | 18% |
| 3-GB(F,F)XB(F)B(F,F)-F | (3-2) | 18% |
| 2-HH-3 | (4-1) | 5% |
| H-BOB-F | (4-4) | 4% |
| 3-BB(F)B(F,F)-F | (4-20) | 5% |

A phase transition temperature of NLC-I: N 90.3 to 102.9 Iso.

In a manner similar to a method in Example 1, chiral liquid crystal composition CLC-I, liquid crystal composition MLC-I and polymer-liquid crystal composite material PSBP-I were obtained.

| | |
|---|---|
| Phase transition temperature of CLC-I | N* 81.5 to 82.2 BP-BP + Iso. 92.0 Iso. Iso. 81.8 BP + Iso.-BP 79.8 to 78.7 N* |
| Phase transition temperature of MLC-I | N* 54.0 to 54.8 BP-BP + Iso. 69.0 Iso. Iso. 66.7 BP + Iso.-BP 51.6 to 49.6 N* |

Physical property values of PSBP-I were as described below.

A phase transition temperature of PSBP-I: BP 75.0 BP+Iso.–Iso.

Polymerization temperature: 54.2° C., cell thickness: 7.74 μm, saturation voltage: 91.1 V, a contrast ratio: 638 and a peak top of a dielectric loss factor curve: 15 kHz.

Example 10

Nematic liquid crystal composition NLC-J was prepared.

| | | |
|---|---|---|
| 4-HHBB(F,F)-F | (1-6) | 10% |
| 4-B(F)B(F,F)B(F,F)XB(F,F)-F | (2-1) | 6.3% |

-continued

| 5-B(F)B(F,F)B(F,F)XB(F,F)-F | (2-1) | 6.3% |
| --- | --- | --- |
| 6-B(F)B(F,F)B(F,F)XB(F,F)-F | (2-1) | 6.3% |
| 3-B(F)B(F,F)B(F,F)XB(F,F)-CF3 | (2-2) | 2.7% |
| 4-B(F)B(F,F)B(F,F)XB(F,F)-CF3 | (2-2) | 2.7% |
| 3-GB(F)B(F,F)XB(F,F)-F | (3-1) | 11.7% |
| 4-GB(F)B(F,F)XB(F,F)-F | (3-1) | 10.8% |
| 5-GB(F)B(F,F)XB(F,F)-F | (3-1) | 10.8% |
| 2-GB(F,F)XB(F)B(F,F)-F | (3-2) | 16.2% |
| 3-GB(F,F)XB(F)B(F,F)-F | (3-2) | 16.2% |

A phase transition temperature of NLC-J: N 105.4 to 106.6 Iso.

In a manner similar to a method in Example 1, chiral liquid crystal composition CLC-J, liquid crystal composition MLC-J and polymer-liquid crystal composite material PSBP-J were obtained.

| Phase transition temperature of CLC-J | N* 96.3 to 96.6 BP-BP + Iso.-Iso. Iso.-BP + Iso.-BP 94.8 to 94.5 N* |
| --- | --- |
| Phase transition temperature of MLC-J | N* 64.8 to 65.2 BP-BP + Iso.-Iso. Iso. 68.5 BP 63.0 to 62.4 N* |

Physical property values of PSBP-J were as described below.

A phase transition temperature of PSBP-J: BP 92.0 BP+Iso.-Iso.

Polymerization temperature: 65.0° C., cell thickness: 7.86 μm, saturation voltage: 52.8 V, a contrast ratio: 690 and a peak top of a dielectric loss factor curve: 20 kHz.

As is obvious from Example and Comparative Example as described above, a peak top of a dielectric loss factor curve is shifted to a side of a higher frequency, and thus the liquid crystal display device of the invention is suitable for drive at a high frequency, and therefore superior to conventional technology.

INDUSTRIAL APPLICABILITY

Specific examples of methods of utilizing the invention include an optical device such as a display device in which a polymer-liquid crystal composite is used.

What is claimed is:

1. A liquid crystal composition that contains achiral component T and a chiral agent, and the liquid crystal composition in which the achiral component T contains at least one compound selected from the group of compounds represented by formula (1), at least one compound selected from the group of compounds represented by formula (2) and at least one compound selected from the group of compounds represented by formula (3) to develop an optically isotropic liquid crystal phase:

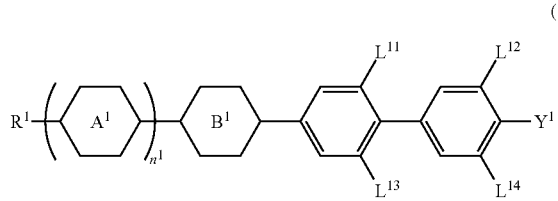

(1)

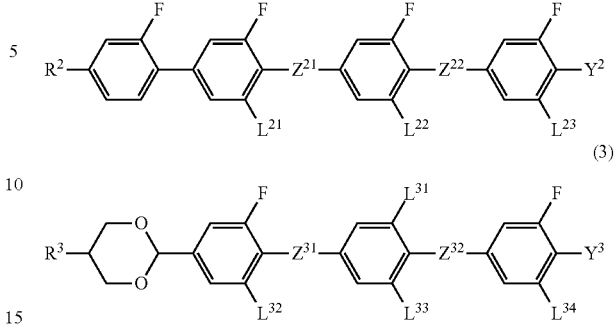

wherein, formula (1), $R^1$ is alkyl having 1 to 12 carbons, alkenyl having 2 to 12 carbons, alkynyl having 2 to 12 carbons or alkoxy having 1 to 11 carbons; ring $A^1$ is 1,4-cyclohexylene, 2-fluoro-1,4-phenylene, 3-fluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; ring $B^1$ is 1,4-cyclohexylene, 1,4-phenylene, 2-fluoro-1,4-phenylene, 3-fluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; $L^{11}$ to $L^{14}$ are independently hydrogen, fluorine or chlorine; $Y^1$ is fluorine, chlorine, $-CF_3$, $-OCF_3$, alkyl having 1 to 12 carbons or alkoxy having 1 to 11 carbons; and $n^1$ is 1 or 2, and in formula (2), $R^2$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons; $Z^{21}$ and $Z^{22}$ are independently a single bond or $-CF_2O-$; $L^{21}$ to $L^{23}$ are independently hydrogen, fluorine or chlorine; and $Y^2$ is fluorine, chlorine, $-CF_3$ or $-OCF_3$, and in formula (3), $R^3$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons; $Z^{31}$ and $Z^{32}$ are independently a single bond or $-CF_2O-$; $L^{31}$ to $L^{34}$ are independently hydrogen, fluorine or chlorine; and $Y^3$ is fluorine, chlorine, $-CF_3$ or $-OCF_3$.

2. The liquid crystal composition according to claim 1, wherein the achiral component T further contains at least one compound selected from the group of compounds represented by formula (4) to develop the optically isotropic liquid crystal phase:

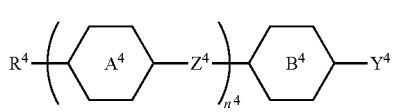

(4)

wherein, in formula (4), $R^4$ is hydrogen, alkyl having 1 to 12 carbons, alkenyl having 2 to 12 carbons, alkynyl having 2 to 12 carbons or alkoxy having 1 to 11 carbons; ring $A^4$ and ring $B^4$ are independently 1,4-cyclohexylene, 1,4-phenylene, 2-fluoro-1,4-phenylene, 3-fluoro-1,4-phenylene, 2,5-difluoro-1,4-phenylene, 3,5-difluoro-1,4-phenylene, pyridine-2,5-diyl, pyrimidine-2,5-diyl, 1,3-dioxane-2,5-diyl or tetrahydropyran-2,5-diyl; $Z^4$ is a single bond, $-O-$, $-COO-$, $-CH_2CH_2-$, $-CH_2O-$ and $-CF_2O-$; $Y^4$ is fluorine, chlorine, —CF₃, —OCF₃, alkyl having 1 to 12 carbons, alkenyl having 2 to 12 carbons or alkoxy having 1 to 11 carbons; and $n^4$ is 1 or 2.

3. The liquid crystal composition according to claim 1, containing a compound in which $n^1$ is 1 in formula (1) to develop the optically isotropic liquid crystal phase.

4. The liquid crystal composition according to claim 1, containing at least one compound selected from the group of compounds represented by formula (1-1) to formula (1-7) to develop the optically isotropic liquid crystal phase:

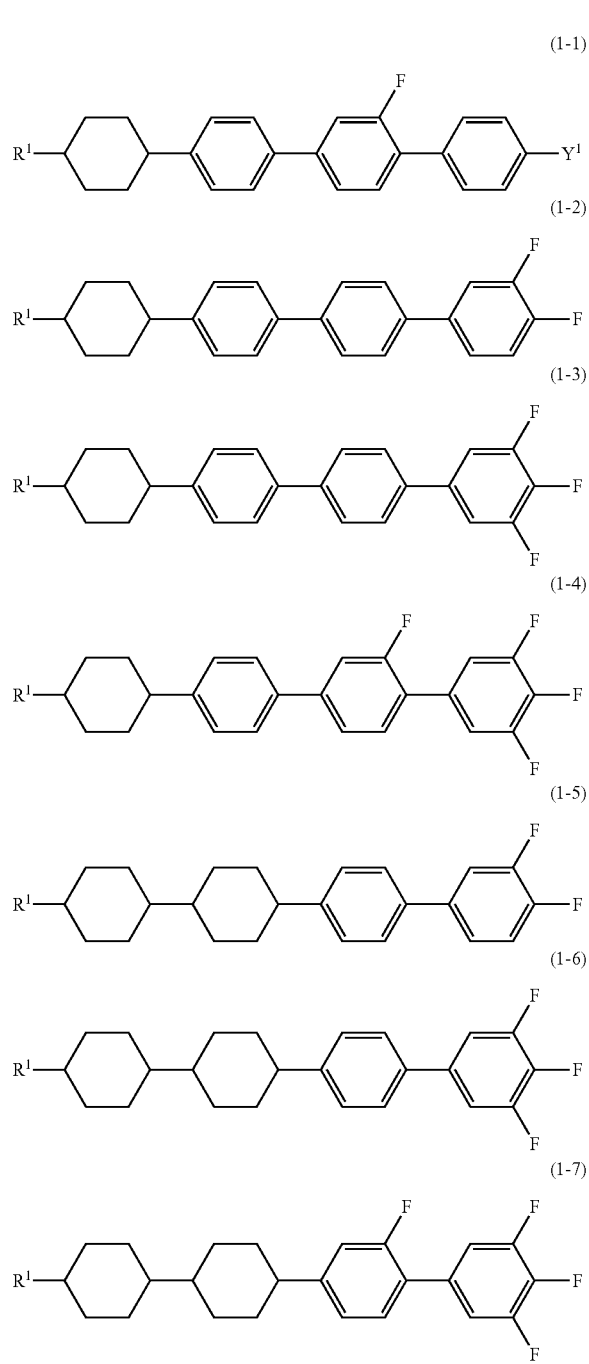

wherein, in formula (1-1) to formula (1-7), $R^1$ is alkyl having 1 to 12 carbons, alkenyl having 2 to 12 carbons, alkynyl having 2 to 12 carbons or alkoxy having 1 to 11 carbons; and $Y^1$ is fluorine, chlorine, —CF₃, —OCF₃, alkyl having 1 to 12 carbons or alkoxy having 1 to 11 carbons.

5. The liquid crystal composition according to claim 1, containing at least one compound selected from the group of compounds represented by formula (2-1) to formula (2-6) to develop the optically isotropic liquid crystal phase:

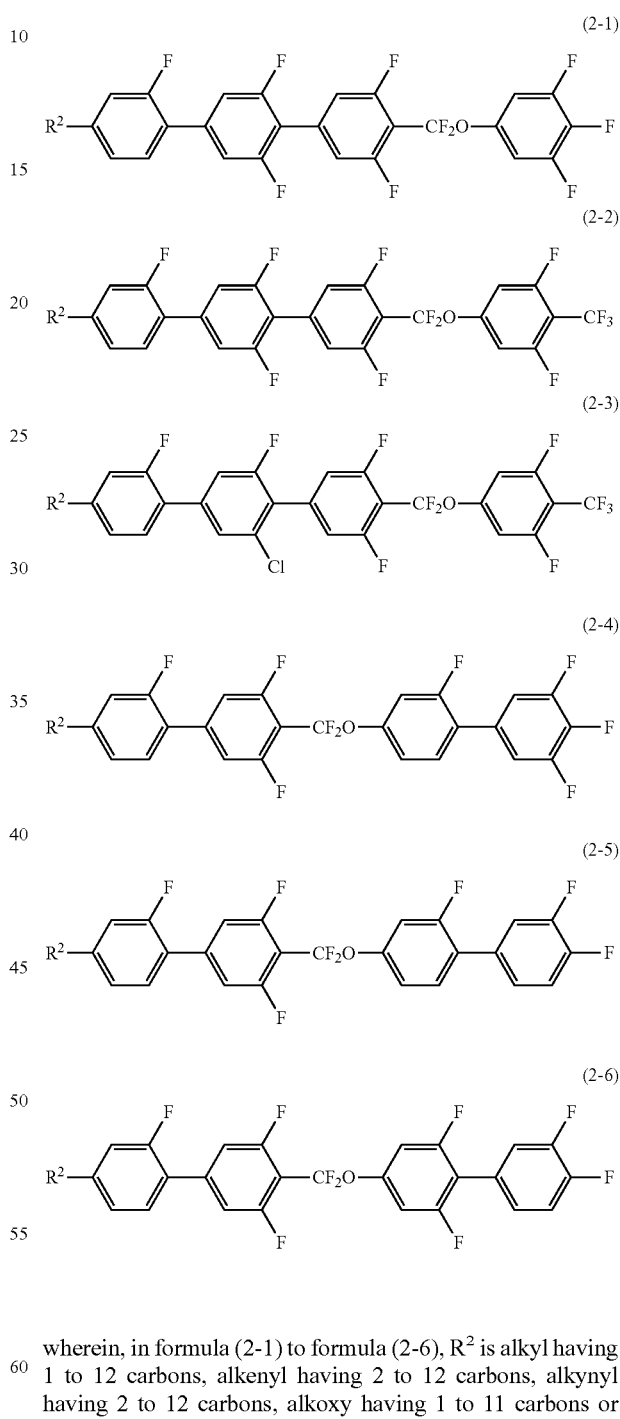

wherein, in formula (2-1) to formula (2-6), $R^2$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons.

6. The liquid crystal composition according to claim 1, containing at least one compound selected from the group of compounds represented by formula (3-1) to formula (3-3) to develop the optically isotropic liquid crystal phase:

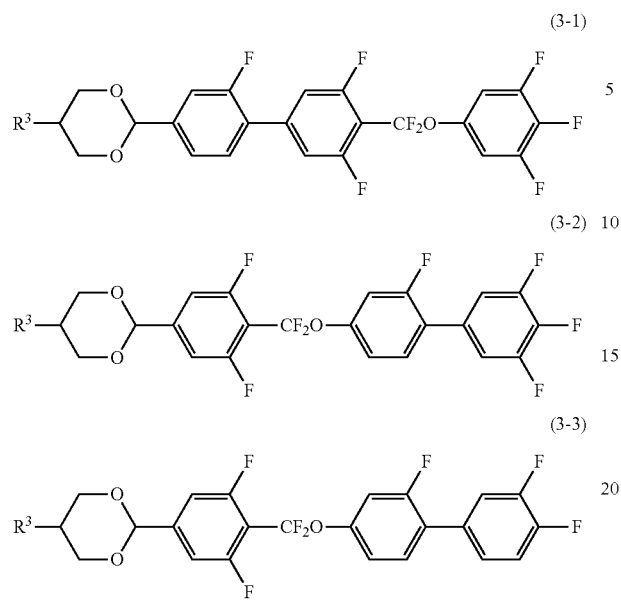

(3-1)
(3-2)
(3-3)

wherein, in formula (3-1) to formula (3-3), $R^3$ is alkyl having 1 to 12 carbons, alkenyl having 2 to 12 carbons, alkynyl having 2 to 12 carbons, alkoxy having 1 to 11 carbons or alkoxyalkyl having 2 to 9 carbons.

7. The liquid crystal composition according to claim 2, containing at least one compound selected from the group of compounds represented by formula (4-1) to formula (4-23) to develop the optically isotropic liquid crystal phase:

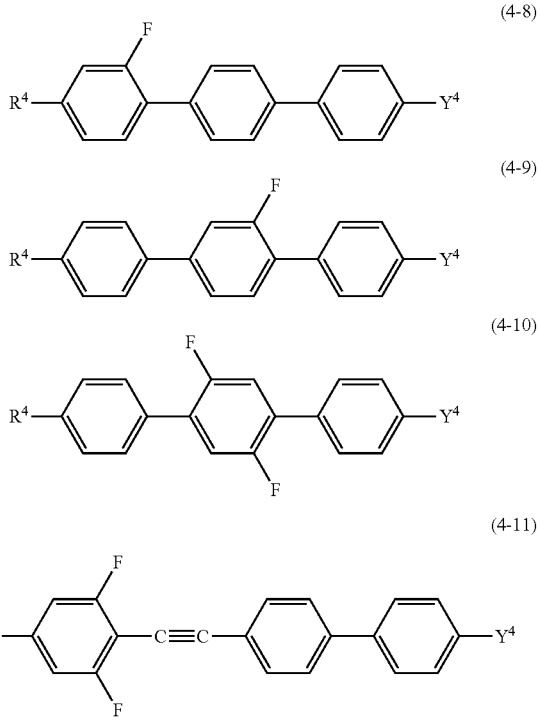

(4-1)
(4-2)
(4-3)
(4-4)
(4-5)

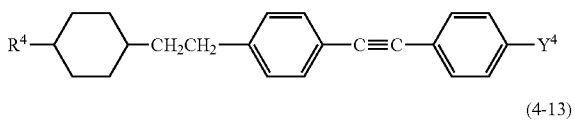

(4-6)

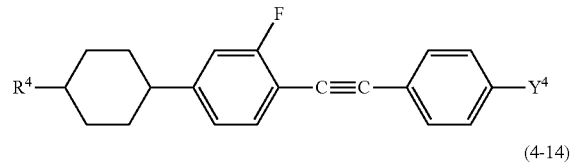

(4-7)

-continued

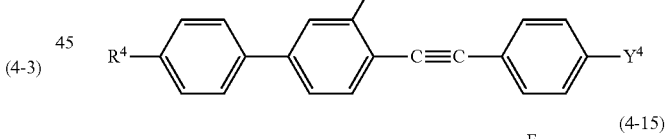

(4-8)
(4-9)
(4-10)
(4-11)
(4-12)

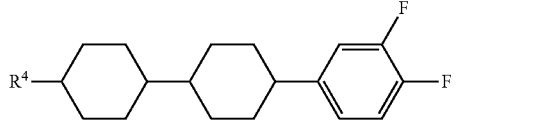

(4-13)

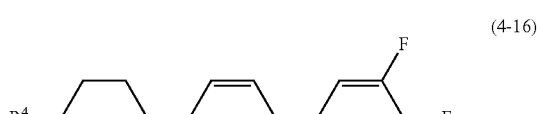

(4-14)

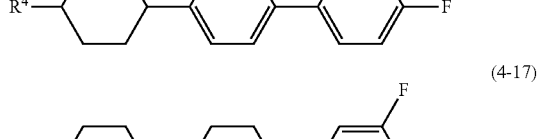

(4-15)
(4-16)

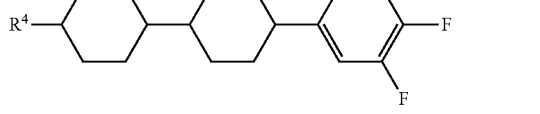

(4-17)

-continued

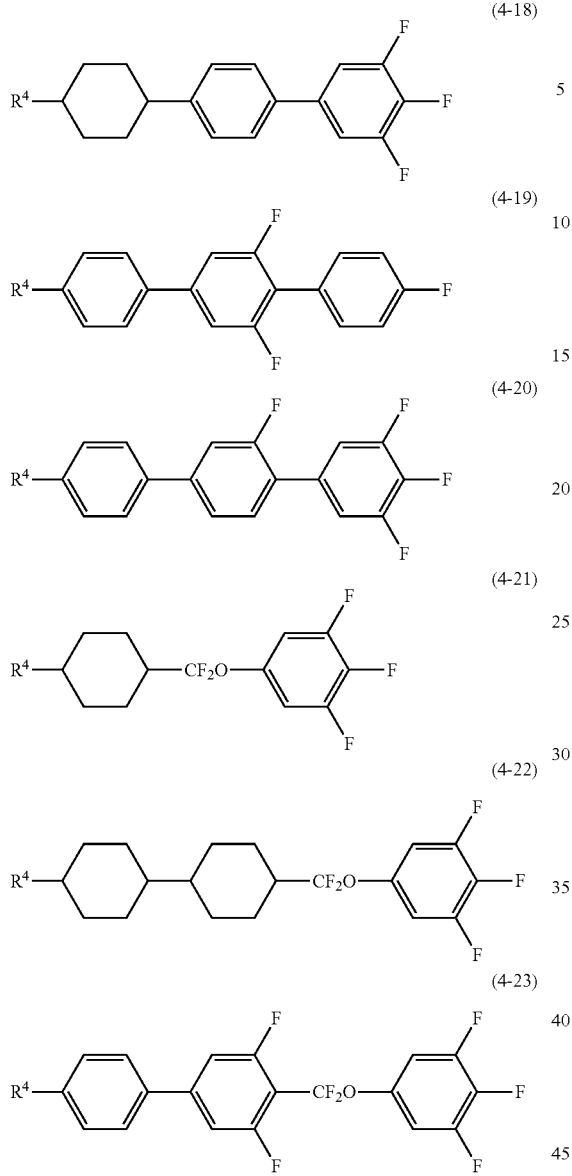

(4-18)
(4-19)
(4-20)
(4-21)
(4-22)
(4-23)

wherein, in formula (4-1) to formula (4-23), $R^4$ is hydrogen, alkyl having 1 to 12 carbons, alkenyl having 2 to 12 carbons, alkynyl having 2 to 12 carbons or alkoxy having 1 to 11 carbons; and $Y^4$ is fluorine, chlorine, —$CF_3$, —$OCF_3$, alkyl having 1 to 12 carbons, alkenyl having 2 to 12 carbons or alkoxy having 1 to 11 carbons.

8. The liquid crystal composition according to claim 2, containing 1% by weight to 30% by weight of the at least one compound selected from the group of compounds represented by formula (1), 50% by weight to 95% by weight of a sum of the at least one compound selected from the group of compounds represented by formula (2) and the at least one compound selected from the group of compounds represented by formula (3), and 1% by weight to 30% by weight of the at least one compound selected from the group of compounds represented by formula (4), based on the total weight of the achiral component T.

9. The liquid crystal composition according to claim 1, wherein the chiral agent is at least one compound selected from the group of compounds represented by formulas (K1) to (K6):

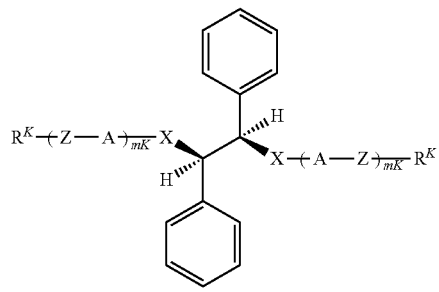

(K1)

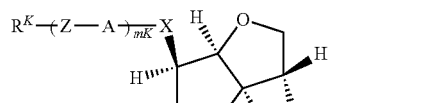

(K2)

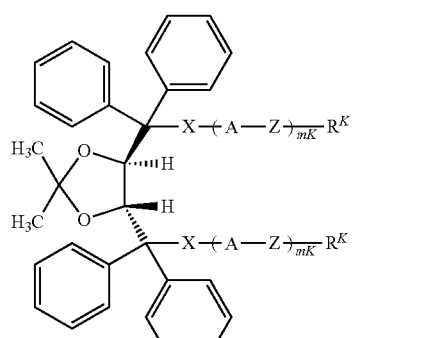

(K3)

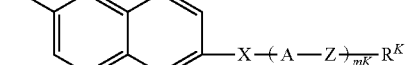

(K4)

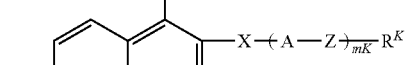

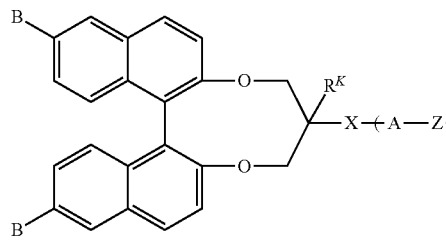

(K5)

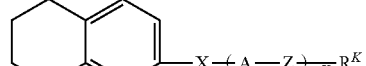

(K6)

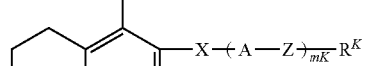

wherein, in the formulas, $R^K$ is each independently hydrogen, halogen, —C≡N, —N=C=O, —N=C=S or alkyl having 1 to 20 carbons, and in $R^K$, at least one piece of —$CH_2$— may be replaced by —O—, —S—, —COO— or —OCO—, at least one piece of —CH$_2$—CH$_2$—may be replaced by —CH═CH—, —CF═CF— or —C≡C—, and at least one hydrogen may be replaced by fluorine or chlorine;

- A is each independently an aromatic 6-membered to 8-membered ring, a non-aromatic 3-membered to 8-membered ring or a condensed ring having 9 or more carbons, and at least one hydrogen on the rings may be replaced by halogen, or alkyl or haloalkyl having 1 to 3 carbons, —CH$_2$— on the rings may be replaced by —O—, —S— or —NH—, and —CH═ may be replaced by —N═;
- B is each independently hydrogen, halogen, alkyl having 1 to 3 carbons, haloalkyl having 1 to 3 carbons, an aromatic 6-membered to 8-membered ring, a non-aromatic 3-membered to 8-membered ring or a condensed ring having 9 or more carbons, and at least one hydrogen on the rings may be replaced by halogen, or alkyl or haloalkyl having 1 to 3 carbons, —CH$_2$— in the alkyl may be replaced by —O—, —S— or —NH—, and —CH═ may be replaced by —N═;
- Z is each independently a single bond or alkylene having 1 to 8 carbons, and in Z, at least one piece of —CH$_2$— may be replaced by —O—, —S—, —COO—, —OCO—, —CSO—, —OCS—, —N═N—, —CH═N— or —N═CH—, at least one piece of —CH$_2$—CH$_2$— may be replaced by —CH═CH—, —CF═CF— or —C≡C—, and at least one hydrogen may be replaced by halogen;

X is each independently a single bond, —COO—, —OCO—, —CH$_2$O—, —OCH$_2$—, —CF$_2$O—, —OCF$_2$— or —CH$_2$CH$_2$—; and mK is each independently an integer from 1 to 4.

10. The liquid crystal composition according to claim 1, exhibiting a chiral nematic phase in a temperature range of −20° C. to 70° C., and having a helical pitch of 700 nanometers or less in at least part of the temperature range.

11. A mixture, containing the liquid crystal composition according to claim 1 and a polymerizable monomer.

12. A polymer-liquid crystal composite material, obtained by polymerizing the mixture according to claim 11 and used in a device driven in an optically isotropic liquid crystal phase.

13. An optical device having electrodes arranged on one or both of substrates, a liquid crystal medium arranged between the substrates, and an electric field applying means for applying an electric field to the liquid crystal medium through the electrodes, and the optical device in which the liquid crystal medium is the liquid crystal composition according to claim 1, or a polymer-liquid crystal composite material used in a device driven in an optically isotropic liquid crystal phase, obtained by polymerizing a mixture containing the liquid crystal composition according to claim 1 and a polymerizable monomer.

\* \* \* \* \*